United States Patent
Nam et al.

(10) Patent No.: US 11,729,718 B2
(45) Date of Patent: Aug. 15, 2023

(54) TRIGGERING POWER SAVING MODES WITH SCHEDULING DOWNLINK CONTROL INFORMATION

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 17/034,718

(22) Filed: Sep. 28, 2020

(65) Prior Publication Data

US 2021/0099956 A1    Apr. 1, 2021

Related U.S. Application Data

(60) Provisional application No. 62/908,532, filed on Sep. 30, 2019.

(51) Int. Cl.
*H04W 52/02*    (2009.01)
*H04L 1/1812*    (2023.01)
(Continued)

(52) U.S. Cl.
CPC ...... *H04W 52/0235* (2013.01); *H04B 7/0482* (2013.01); *H04L 1/0038* (2013.01);
(Continued)

(58) Field of Classification Search
None
See application file for complete search history.

(56) References Cited

U.S. PATENT DOCUMENTS

2020/0229098 A1\*  7/2020  Cheng ............... H04W 52/0235
2020/0314811 A1\* 10/2020  Lin ........................ H04L 5/0053
(Continued)

FOREIGN PATENT DOCUMENTS

WO    WO-2020143711 A1    7/2020

OTHER PUBLICATIONS

Ericsson: "Discovery and Mitigation of WUS Miss Detection", 3GPP TSG-RAN WG1 Meeting #97, 3GPP Draft; R1-1907329 Discovery and Mitigation of WUS Miss Detection, 3rd Generation Partnership Project (3GPP), Mobile Competence Centre; 650, Route Des Lucioles; F-06921 Sophia-Antipolis Cedex; vol. RAN WG1, No. Reno, USA; May 13, 2019-May 17, 2019, May 13, 2019 (May 13, 2019), pp. 1-2,XP051728768, Retrieved from the Internet: URL: http://www.3gpp.org/ftp/Meetings%5F3GPP%5FSYNC/RAN1/Docs/R1%2D1907329%2Ezip [retrieved on May 13, 2019], Section 2.1.

(Continued)

*Primary Examiner* — Saad Khawar
(74) *Attorney, Agent, or Firm* — Holland & Hart LLP/Qualcomm Incorporated

(57) ABSTRACT

Feedback reports (e.g., hybrid automatic repeat request (HARQ)-acknowledgment (ACK) codebooks) may provide feedback for both downlink data messages (e.g., physical downlink shared channel (PDSCH) messages) and control messages (e.g., physical downlink control channel (PDCCH) messages). As such, a base station may transmit an indication of a power savings mode in a control message (e.g., in scheduling downlink control information (DCI)), and the base station may be able to confirm whether a user equipment (UE) received (e.g., and implemented) the power savings mode via the feedback corresponding to the control message carrying the indication of the power savings mode. The techniques described herein may provide for improved (Continued)

synchronization of base station and UE power savings modes (e.g., as a base station may or may not implement a new power saving mode depending on whether the control message indicating the new power saving mode was successfully received and acknowledged).

30 Claims, 19 Drawing Sheets

(51) Int. Cl.
    *H04B 7/0456*     (2017.01)
    *H04L 1/00*     (2006.01)
    *H04L 5/00*     (2006.01)
    *H04W 72/23*     (2023.01)

(52) U.S. Cl.
    CPC .......... *H04L 1/1819* (2013.01); *H04L 5/0055* (2013.01); *H04W 72/23* (2023.01)

(56) References Cited

U.S. PATENT DOCUMENTS

| | | | |
|---|---|---|---|
| 2021/0184801 A1* | 6/2021 | El Hamss | H04L 1/1854 |
| 2021/0329556 A1* | 10/2021 | Kim | H04W 8/24 |
| 2022/0110059 A1* | 4/2022 | Xue | H04W 52/0235 |

OTHER PUBLICATIONS

International Search Report and Written Opinion—PCT/US2020/053237—ISA/EPO—dated Dec. 23, 2020 (195588WO).
Qualcomm Incorporated: "PDCCH-Based Power Saving Channel Design", 3GPP Draft, 3GPP TSG-RAN WG1 #97, R1-1907294, PDCCH-based Power Saving Channel Design, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728734, 16 Pages, Retrieved from the Internet: URL: http://www.3gpp.org/ftp/Meetings%5F3GPP%5FSYNC/RAN1/Docs/R1%2D1907294%2Ezip [retrieved on May 13, 2019] paragraph [2.2.3.1]-paragraph [2.2.3.3], p. 1-p. 15, Section 2.3.2.
ZTE: "Discussion on PDCCH-Based Power Saving Signal", 3GPP TSG RAN WG1 #98, 3GPP Draft; R1-1908198—Discussion onPDCCH-Based Power Saving Signal—Final, 3rd Generation Partnership Project (3GPP), Mobile Competence Centre, 650, Route Des Lucioles; F-06921 Sophia-Antipolis Ced, vol. RAN WG1, No. Prague, Czech Republic; Aug. 26, 2019-Aug. 30, 2019, Aug. 17, 2019 (Aug. 17, 2019), 14Pages,XP051764818, Retrieved from the Internet: URL: http://www.3gpp.org/ftp/tsg_ran/WG1_RL1/TSGR1_98/Docs/R1-1908198.zip [retrieved on Aug. 17, 2019], Section 2.3.

\* cited by examiner

TRIGGERING POWER SAVING MODES WITH SCHEDULING DOWNLINK CONTROL INFORMATION

CROSS REFERENCE

The present Application for Patent claims the benefit of U.S. Provisional Patent Application No. 62/908,532 by NAM et al., entitled "TRIGGERING POWER SAVING MODES WITH SCHEDULING DOWNLINK CONTROL INFORMATION," filed Sep. 30, 2019, assigned to the assignee hereof, and expressly incorporated by reference herein.

BACKGROUND

The following relates generally to wireless communications, and more specifically to triggering power saving modes with scheduling downlink control information (DCI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may implement a discontinuous reception (DRX) cycle to enable more efficient use of battery power for reception of downlink transmissions. A base station and a UE may establish a radio resource control (RRC) connection and the UE may enter a sleep state when not actively communicating with the base station. For example, during RRC connection establishment, a DRX configuration, including a DRX-on cycle duration and a DRX-off cycle duration, may be configured in an RRC connection setup request or an RRC connection reconfiguration request. The DRX configuration may determine how frequently the UE is scheduled to wake-up and be available for receiving downlink data in accordance with the configured DRX cycle durations. The UE may thus transition between an active state (e.g., where the UE wakes up to determine if data is available for the UE) and a sleep state (e.g., where the UE shuts down various hardware/processes to conserve power). Techniques for further power savings (e.g., when a UE is operating in an active state) may be desired.

SUMMARY

The described techniques relate to improved methods, systems, devices, and apparatuses that support triggering power saving modes with scheduling downlink control information (DCI). Generally, the described techniques provide for user equipment (UE) transmission of feedback (e.g., hybrid automatic repeat request (HARQ)-acknowledgement (ACK) feedback) corresponding to downlink control information (e.g., DCI indicating an indication of a power savings mode). For example, a wireless communications system may support semi-static codebook based HARQ feedback. In such systems, a UE may transmit, to a base station, a number of information bits within a HARQ-ACK codebook. As an example, the UE may monitor for downlink transmissions during one or more monitoring occasions, detect one or more downlink transmissions, and may indicate whether each detected downlink transmission was successfully decoded by the UE using respective information bits. Further, according to the techniques described herein, a UE may indicate whether a control message (e.g., a control message including an indication of a power savings mode) was successfully decoded by the UE using respective information bits.

The UE may thus transmit the HARQ-ACK codebook providing feedback to a base station for both downlink data messages (e.g., physical downlink shared channel (PDSCH) messages) and control messages (e.g., physical downlink control channel (PDCCH) messages). As such, a base station may transmit an indication of a power savings mode in a control message (e.g., in DCI), and the base station may be able to confirm whether the UE received (e.g., and implemented) the power savings mode via the feedback corresponding to the control message carrying the indication of the power savings mode. Accordingly, the techniques described herein may provide for improved synchronization of base station and UE power savings modes (e.g., such that wireless communications systems may avoid scenarios where a base station assumes a new power savings mode based on a transmitted power savings mode indication, but a UE remains in an old power savings mode because the control message carrying the indication of the new power savings mode was missed).

A method of wireless communication at a UE is described. The method may include monitoring for a downlink data message during a scheduled monitoring occasion, generating, based on the monitoring, a feedback report including a first information bit for downlink data message feedback corresponding to the downlink data message, where the feedback report or a transmission of the feedback report is indicative, separate from the first information bit, of control information feedback corresponding to a control message associated with the downlink data message, and transmitting the feedback report to a base station.

An apparatus for wireless communication at a UE is described. The apparatus may include a processor, memory coupled with the processor, and instructions stored in the memory. The instructions may be executable by the processor to cause the apparatus to monitor for a downlink data message during a scheduled monitoring occasion, generate, based on the monitoring, a feedback report including a first information bit for downlink data message feedback corresponding to the downlink data message, where the feedback report or a transmission of the feedback report is indicative, separate from the first information bit, of control information feedback corresponding to a control message associated with the downlink data message, and transmit the feedback report to a base station.

Another apparatus for wireless communication at a UE is described. The apparatus may include means for monitoring for a downlink data message during a scheduled monitoring occasion, generating, based on the monitoring, a feedback report including a first information bit for downlink data message feedback corresponding to the downlink data message, where the feedback report or a transmission of the feedback report is indicative, separate from the first information bit, of control information feedback corresponding to a control message associated with the downlink data message, and transmitting the feedback report to a base station.

A non-transitory computer-readable medium storing code for wireless communication at a UE is described. The code may include instructions executable by a processor to monitor for a downlink data message during a scheduled monitoring occasion, generate, based on the monitoring, a feedback report including a first information bit for downlink data message feedback corresponding to the downlink data message, where the feedback report or a transmission of the feedback report is indicative, separate from the first information bit, of control information feedback corresponding to a control message associated with the downlink data message, and transmit the feedback report to a base station.

In some examples of the method, apparatuses, and non-transitory computer-readable medium described herein, generating the feedback report may include operations, features, means, or instructions for determining the first information bit based on whether the downlink data message was successfully decoded, and determining a second information bit based on whether the control message was successfully decoded, where the feedback report may be indicative of the control information feedback by including the second information bit for the control information feedback.

Some examples of the method, apparatuses, and non-transitory computer-readable medium described herein may further include operations, features, means, or instructions for decoding the control message, where the control message includes an indication of a power savings mode, and transitioning to the power savings mode based on the indication, where the second information bit may be indicative of successful decoding of the indication. Some examples of the method, apparatuses, and non-transitory computer-readable medium described herein may further include operations, features, means, or instructions for decoding the downlink data message based on the monitoring, where the first information bit includes a first acknowledgement corresponding to the decoding of the downlink data message and the second information bit includes a second acknowledgement corresponding to the decoding of the control message.

In some examples of the method, apparatuses, and non-transitory computer-readable medium described herein, presence of the second information bit in the feedback report may be indicative that the control message includes the indication of the power savings mode. Some examples of the method, apparatuses, and non-transitory computer-readable medium described herein may further include operations, features, means, or instructions for determining that the downlink data message was missed based on the monitoring, where the first information bit indicates that the downlink data message was missed. In some examples of the method, apparatuses, and non-transitory computer-readable medium described herein, the first information bit includes a negative acknowledgement corresponding to the missed downlink data message and the second information bit includes a positive acknowledgement corresponding to the decoding of the control message.

In some examples of the method, apparatuses, and non-transitory computer-readable medium described herein, presence of the second information bit in the feedback report may be based on the determination that the downlink data message was missed even though the control message was successfully decoded. Some examples of the method, apparatuses, and non-transitory computer-readable medium described herein may further include operations, features, means, or instructions for determining that both the control message and the downlink data message were missed, where the first information bit and the second information bit indicate that the downlink data message and the control message were missed, respectively. In some examples of the method, apparatuses, and non-transitory computer-readable medium described herein, the first information bit includes a first negative acknowledgement corresponding to the missed downlink data message and the second information bit includes a second negative acknowledgement corresponding to the missed control message.

In some examples of the method, apparatuses, and non-transitory computer-readable medium described herein, the feedback report includes a hybrid automatic repeat request feedback report that includes positive acknowledgement/negative acknowledgement information conveyed by the first information bit and the second information bit. Some examples of the method, apparatuses, and non-transitory computer-readable medium described herein may further include operations, features, means, or instructions for determining a waveform, an uplink resource, a scrambling sequence, a cyclic redundancy check encoding sequence, or some combination thereof based on whether the control message was successfully decoded, where the feedback report may be indicative of the control information feedback based on the feedback report being transmitted using the waveform, the uplink resource, the scrambling sequence, the cyclic redundancy check encoding sequence, or some combination thereof.

A method of wireless communication at a base station is described. The method may include transmitting, to a UE, a control message associated with a downlink data message, where the control message includes an indication of a power savings mode to be applied by the UE, transmitting the downlink data message to the UE, and receiving, from the UE, a feedback report including a first information bit for downlink data message feedback corresponding to the downlink data message, where the feedback report is indicative, separate from the first information bit, of control information feedback corresponding to the control message.

An apparatus for wireless communication at a base station is described. The apparatus may include a processor, memory coupled with the processor, and instructions stored in the memory. The instructions may be executable by the processor to cause the apparatus to transmit, to a UE, a control message associated with a downlink data message, where the control message includes an indication of a power savings mode to be applied by the UE, transmit the downlink data message to the UE, and receive, from the UE, a feedback report including a first information bit for downlink data message feedback corresponding to the downlink data message, where the feedback report is indicative, separate from the first information bit, of control information feedback corresponding to the control message.

Another apparatus for wireless communication at a base station is described. The apparatus may include means for transmitting, to a UE, a control message associated with a downlink data message, where the control message includes an indication of a power savings mode to be applied by the UE, transmitting the downlink data message to the UE, and receiving, from the UE, a feedback report including a first information bit for downlink data message feedback corresponding to the downlink data message, where the feedback report is indicative, separate from the first information bit, of control information feedback corresponding to the control message.

A non-transitory computer-readable medium storing code for wireless communication at a base station is described. The code may include instructions executable by a processor to transmit, to a UE, a control message associated with a downlink data message, where the control message includes an indication of a power savings mode to be applied by the UE, transmit the downlink data message to the UE, and receive, from the UE, a feedback report including a first information bit for downlink data message feedback corresponding to the downlink data message, where the feedback report is indicative, separate from the first information bit, of control information feedback corresponding to the control message.

Some examples of the method, apparatuses, and non-transitory computer-readable medium described herein may further include operations, features, means, or instructions for transitioning to the power savings mode based on the feedback report, where the feedback report indicates the UE successfully decoded the control message including the indication of the power savings mode. In some examples of the method, apparatuses, and non-transitory computer-readable medium described herein, the first information bit includes a first acknowledgement corresponding to UE decoding of the downlink data message and a second information bit includes a second acknowledgement corresponding to UE decoding of the control message, where the feedback report may be indicative of the control information feedback by including the second information bit for the control information feedback.

In some examples of the method, apparatuses, and non-transitory computer-readable medium described herein, the first information bit includes a negative acknowledgement corresponding to UE decoding of the downlink data message and a second information bit includes a positive acknowledgement corresponding to UE decoding of the control message, where the feedback report may be indicative of the control information feedback by including the second information bit for the control information feedback. Some examples of the method, apparatuses, and non-transitory computer-readable medium described herein may further include operations, features, means, or instructions for determining to remain in a current power savings mode based on the feedback report, where the feedback report indicates that the UE missed the control message including the indication of the power savings mode.

In some examples of the method, apparatuses, and non-transitory computer-readable medium described herein, the first information bit includes a first negative acknowledgement corresponding to the missed downlink data message and a second information bit includes a second negative acknowledgement corresponding to the control message, where the feedback report may be indicative of the control information feedback by including the second information bit for the control information feedback. Some examples of the method, apparatuses, and non-transitory computer-readable medium described herein may further include operations, features, means, or instructions for decoding the received feedback report based on a blind decoding operation, where the blind decoding operation may be performed using one or more codebook sizes.

In some examples of the method, apparatuses, and non-transitory computer-readable medium described herein, a first codebook size of the one or more codebook sizes may be based on one or both of a number of monitoring occasions configured by the base station and the control message including the indication of the power savings mode.

In some examples of the method, apparatuses, and non-transitory computer-readable medium described herein, a first codebook size of the one or more codebook sizes may be based on a number of control message transmissions including power savings mode indications. In some examples of the method, apparatuses, and non-transitory computer-readable medium described herein, a first codebook size of the one or more codebook sizes may be based on a maximum number of power saving mode indications per uplink feedback report occasion. In some examples of the method, apparatuses, and non-transitory computer-readable medium described herein, the received feedback report may be decoded based on a waveform, an uplink resource, a scrambling sequence, a cyclic redundancy check encoding sequence, or some combination thereof.

In some examples of the method, apparatuses, and non-transitory computer-readable medium described herein, the feedback report may be indicative of the control information feedback based on the feedback report being transmitted using a waveform, a uplink resource, a scrambling sequence, a cyclic redundancy check encoding sequence, or some combination thereof. In some examples of the method, apparatuses, and non-transitory computer-readable medium described herein, the feedback report includes a hybrid automatic repeat request feedback report that includes positive acknowledgement/negative acknowledgement information conveyed by the first information bit and the second information bit.

DETAILED DESCRIPTION

Figure 1:
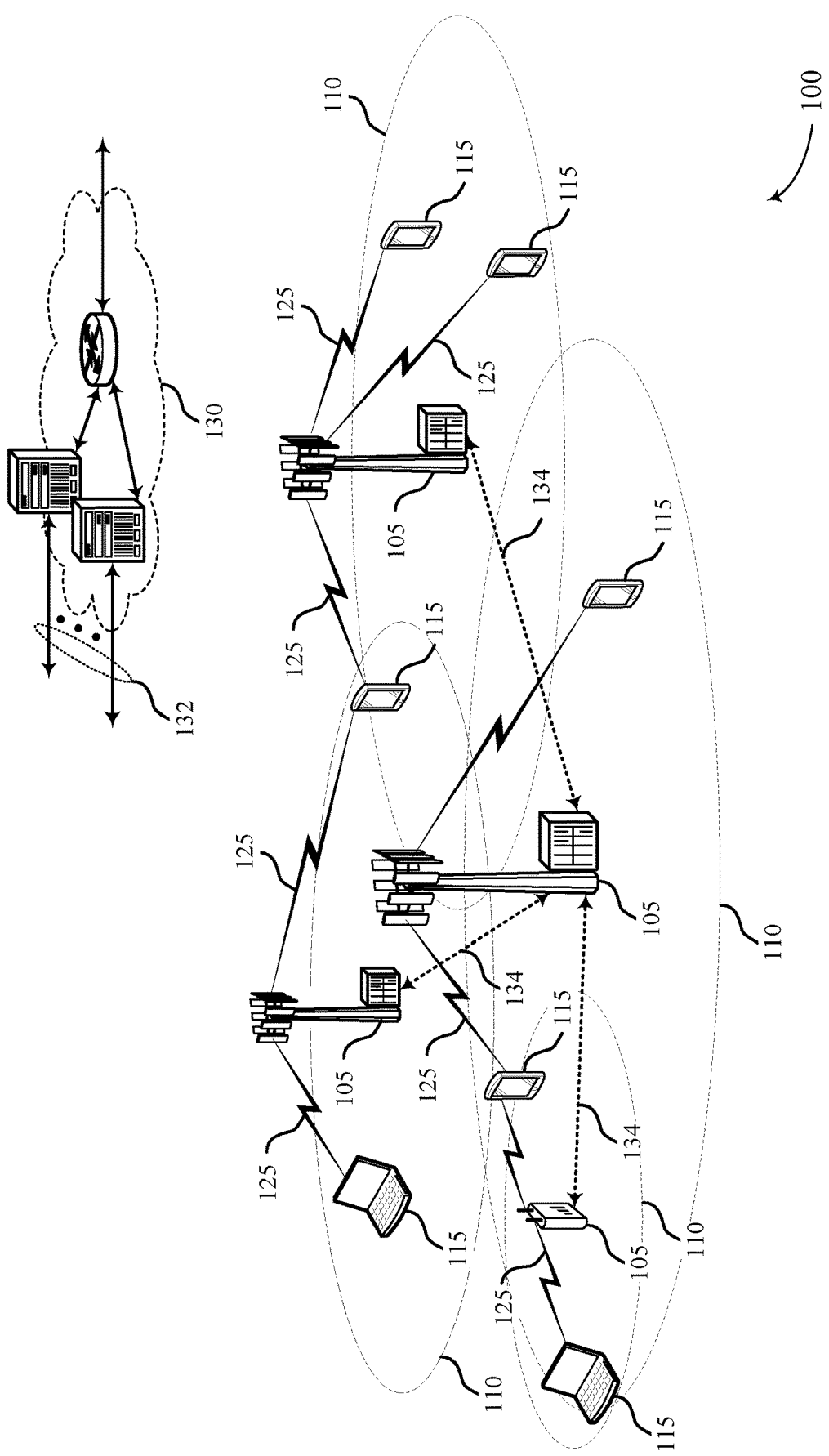
FIG. 1 illustrates an example of a system for wireless communications that supports triggering power saving modes with scheduling downlink control information (DCI) in accordance with aspects of the present disclosure.

Wireless communications systems may support various power saving schemes (e.g., to reduce power consumption for communicating devices such as user equipment (UE), which may be power limited, as well as base stations). In some examples, a wireless communications system may implement one or more power saving modes, and a base station and a UE may communicate according to such power saving modes (e.g., where each power saving mode may be associated with varying operational characteristics, and thus varying rates of power consumption). For example, a power saving mode may be associated with a minimum applicable downlink scheduling offset, a minimum downlink control channel monitoring periodicity, a maximum number of downlink multiple-input multiple-outlet (MIMO) layers, etc. As such, configuration of different power saving modes may configure different rates of power consumption by increasing or decreasing a number of available receive chains in a UE, initiating a time delay between one or more frequency scan requests performed by the UE (e.g., increasing or decreasing offsets between downlink monitoring occasions), etc.

In some cases, configuration of power saving modes (e.g., indication of power saving modes) may be performed via scheduling downlink control information (DCI). For example, if a UE supports N different power saving modes, a field of $M=[\log_2 N]$ bits may be added to scheduling DCI to support scheduling DCI based power saving mode indication. When a UE is indicated a new power saving mode, which is different from the current power saving mode, the new power saving mode may be applied for subsequent communications between the base station and the UE after some time delay. However, in some cases, power saving modes employed by a base station and a UE may become misaligned. For example, in cases where a UE does not successfully receive a control message including an indication of a new power saving mode, a base station may assume the UE will implement the new power saving mode (e.g., after the time delay), however the UE may maintain a current or old power saving mode (e.g., as the UE may have missed the control message and thus be unaware of the newly configured power saving mode).

According to the techniques described herein, a UE may indicate whether a control message (e.g., a control message including an indication of a power saving mode) was successfully decoded by the UE via feedback reporting (e.g., via hybrid automatic repeat request (HARQ)-acknowledgement (ACK) feedback). For example, a wireless communications system may support semi-static codebook based HARQ feedback. In such systems, a UE may transmit, to a base station, a HARQ-ACK codebook including one or more information bits corresponding to control messages (e.g., DCI including an indication of power saving modes) in addition to one or more information bits corresponding to downlink data messages. As an example, the UE may monitor for downlink transmissions during one or more monitoring occasions, detect one or more downlink transmissions, and indicate whether one or more control messages and corresponding downlink data messages were successfully decoded by the UE using respective information bits.

The UE may thus transmit the HARQ-ACK codebook providing feedback to a base station for both downlink data messages (e.g., physical downlink shared channel (PDSCH) messages) and control messages (e.g., physical downlink control channel (PDCCH) messages). As such, a base station may transmit an indication of a power saving mode in a control message (e.g., in DCI), and the base station may be able to confirm whether the UE received (e.g., and implemented) the power saving mode via the feedback corresponding to the control message carrying the indication of the power saving mode. Accordingly, the techniques described herein may provide for improved synchronization of base station and UE power saving modes (e.g., such that wireless communications systems may avoid scenarios where a base station assumes a new power saving mode based on a transmitted power saving mode indication, but a UE remains in an old power saving mode because the control message carrying the indication of the new power saving mode was missed).

In some cases, a UE may include an additional information bit (e.g., added for acknowledgement for PDCCH reception) for HARQ-ACK for each candidate PDSCH occasion. In other examples, an additional bit may be added only when the candidate PDSCH is scheduled by a PDCCH indicating a new power saving mode (e.g., a power saving mode different from a power saving mode currently employed by the UE). As such, according to some aspects, the described techniques may also provide for base station blind decoding techniques. For example, in cases where an additional bit may be added only when the candidate PDSCH is scheduled by a PDCCH indicating a new power saving mode, a base station may decode such feedback by testing different HARQ-ACK codebook sizes, as an additional bit (e.g., for PDSCH that is scheduled by a PDCCH indicating a new power saving mode) may or may not be added to the HARQ-ACK codebook by the UE depending on whether or not the UE successfully received the PDCCH.

Aspects of the disclosure are initially described in the context of a wireless communications system. Example control message feedback diagrams, example feedback configurations, and example process flows illustrating one or more aspects of the disclosure are then described. Aspects of the disclosure are further illustrated by and described with reference to apparatus diagrams, system diagrams, and flowcharts that relate to triggering power saving modes with scheduling DCI.

FIG. 1 illustrates an example of a wireless communications system 100 that supports triggering power saving modes with scheduling DCI in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

PDCCH carries DCI in control channel elements (CCEs), which may consist of nine logically contiguous resource element groups (REGs), where each REG contains 4 resource elements (REs). DCI includes information regarding downlink scheduling assignments, uplink resource grants, transmission scheme, uplink power control, HARQ information, a modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH may carry DCI messages associated with multiple users, and each UE 115 may decode the DCI messages that are intended for it. For example, each UE 115 may be assigned a C-RNTI and CRC bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated)

CCE region or search space. The common CCE region is monitored by all UEs served by a base station 105 and may include information such as paging information, system information, random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

PUCCH may be mapped to a control channel defined by a code and two consecutive resource blocks. Uplink control signaling may depend on the presence of timing synchronization for a cell. PUCCH resources for SR and a channel quality indicator (CQI) reporting may be assigned (and revoked) through RRC signaling. In some cases, resources for SR may be assigned after acquiring synchronization through a random access channel (RACH) procedure. In other cases, an SR may not be assigned to a UE 115 through the RACH (i.e., synchronized UEs 115 may or may not have a dedicated SR channel). PUCCH resources for SR and CQI may be lost when the UE is no longer synchronized.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A wireless device may implement a discontinuous reception (DRX) cycle to enable the efficient use of battery power for reception of downlink transmissions. A base station 105 and a UE 115 may establish a radio resource control (RRC) connection and the UE 115 may enter a sleep state when not actively communicating with the base station 105. For example, during RRC connection establishment, a DRX configuration, including a DRX-on cycle duration and a DRX-off cycle duration, may be configured in an RRC connection setup request or an RRC connection reconfiguration request. The DRX configuration may determine how frequently the UE 115 is scheduled to wake-up and be available for receiving downlink data in accordance with the configured DRX cycle durations. For example, a UE 115 may operate in a connected DRX (C-DRX) mode, where the UE 115 transitions between an active state (e.g., where the UE 115 wakes up to determine if data is available for the UE 115) and a sleep state (e.g., where the UE 115 shuts down various hardware/processes to conserve power).

In some examples, prior to transitioning to an active state during a DRX on-duration, the UE 115 may determine if any downlink data is present for the UE 115 by monitoring for one or more wake-up signals (WUSs) during WUS occasions (e.g., during configured WUS occasions of DRX off-durations or UE sleep states). The WUSs may carry or otherwise convey an indication that the base station 105 has data ready to transmit to the UE 115 during a next DRX on-duration (e.g., during a next DRX active time). In such systems, a UE 115 may conserve power by being configured to only wake-up (e.g., transition to an active state) in an on-duration of a DRX cycle when the UE 115 receives a WUS from the base station 105 prior to the DRX on-duration (e.g., within a WUS occasion). In some cases, power saving techniques for UEs 115 in an active state may be desired.

Wireless communications system 100 may support various power saving schemes (e.g., to reduce power consumption for communicating devices such as UEs 115, which may be power limited, as well as base stations 105). In some examples, wireless communications system 100 may implement one or more power saving modes (e.g., which may be referred to as power savings modes, power modes, throughput modes, sleep modes, conservative modes, etc.), and base stations 105 and UEs 115 may communicate according to such power saving modes (e.g., where each power saving mode may be associated with varying operational characteristics, and thus varying rates of power consumption). For example, a power saving mode may be associated with a minimum applicable downlink scheduling offset, a minimum downlink control channel monitoring periodicity, a maximum number of downlink MIMO layers, etc. As such, configuration of different power saving modes may configure different rates of power consumption by increasing or decreasing a number of available receive chains in a UE 115, initiating a time delay between one or more frequency scan requests performed by the UE 115 (e.g., increasing or decreasing offsets between downlink monitoring occasions), etc.

In some cases, configuration of power saving modes (e.g., indication of power saving modes) may be performed via scheduling PDCCH (e.g., scheduling DCI). For example, if a UE 115 supports N different power saving modes, a field of M=[$\log_2$ N] bits may be added to scheduling DCI to support scheduling DCI based power saving mode indication. When a UE 115 is indicated a new power saving mode, which is different from the current power saving mode, the new power saving mode may be applied for subsequent communications between the base station 105 and the UE 115 after some time delay. However, in some cases, power saving modes employed by a base station 105 and a UE 115 may become misaligned. For example, in cases where a UE 115 does not successfully receive a control message including an indication of a new power saving mode, a base station 105 may assume the UE 115 will implement the new power saving mode (e.g., after the time delay), however the UE 115 may maintain a current or old power saving mode (e.g., as the UE 115 may have missed the control message and thus be unaware of the newly configured power saving mode).

In some wireless communications systems, UEs 115 may use HARQ feedback to ensure reception of data transmitted within the system. For example, a UE 115 may send HARQ feedback transmissions that include information bits indicative of a positive or negative acknowledgement (e.g., an ACK or a NACK) for data transmitted to the UE 115. In some cases, a flexible frame structure and semi-static indications of HARQ feedback may be used. As such, a time offset may be established between reception of a downlink message (e.g., a PDSCH, a PDCCH, etc.) and transmission of corresponding HARQ feedback. The system may also utilize codebook-based HARQ feedback, where multiple HARQ feedback transmissions (e.g., positive acknowledgement/negative acknowledgement information) may be transmitted simultaneously on a single feedback occasion (e.g., in a configured physical uplink control channel (PUCCH)), and respective information bits representing detected messages may be encoded in a HARQ-ACK codebook. For instance, a semi-static codebook (e.g., a Type 1 HARQ-ACK codebook) may be used, where a HARQ feedback bit for a potential downlink message may be reserved in a semi-static codebook (e.g., of a fixed size, regardless of the actual transmission of the downlink message).

In some cases, wireless communications system 100 may support transmission of dynamic HARQ-ACK codebooks (e.g., using a Type 2 HARQ-ACK codebook). As such, a UE 115 may transmit a number of information bits within a HARQ-ACK codebook to a base station 105. The UE 115 may monitor for downlink transmissions (e.g., PDSCH, PDCCH, or both) during one or more monitoring occasions. The UE 115 may indicate, using respective information bits within the HARQ-ACK codebook, whether each detected downlink transmission was decoded successfully by the UE 115. When generating the HARQ-ACK codebook, the UE 115 may determine a codebook size based on a number of the information bits included within the HARQ-ACK codebook.

According to the techniques described herein, a UE 115 may further indicate whether a control message (e.g., a control message including an indication of a power saving mode) was successfully decoded by the UE 115 (e.g., via a feedback report including one or more information bits dedicated to positive acknowledgement/negative acknowledgement information for control messaging). For example, a UE 115 may transmit a HARQ-ACK codebook providing feedback to a base station 105 for both downlink data messages (e.g., PDSCH messages) and control messages (e.g., PDCCH messages). As such, a base station 105 may transmit an indication of a power saving mode in a control message (e.g., in DCI), and the base station 105 may be able to confirm whether the UE 115 received (e.g., and implemented) the power saving mode via the feedback corresponding to the control message carrying the indication of the power saving mode. As such, the techniques described herein may provide for improved synchronization of base station 105 and UE 115 power saving modes (e.g., such that wireless communications systems may avoid scenarios where a base station assumes a new power saving mode based on a transmitted power saving mode indication, but a UE 115 remains in an old power saving mode because the control message carrying the indication of the new power saving mode was missed).

As such, wireless communications system 100 may more efficiently handle power saving mode configuration. For example, a base station 105 may more effectively manage UE 115 power saving modes by ensuring that control messages (e.g., indications of power saving modes) that are missed by a UE 115 are re-transmitted to the UE 115. Additionally or alternatively, in scenarios where a base station 105 identifies that a UE has missed an indication of a new power saving mode (e.g., based on an information bit or a negative acknowledgement, included in a feedback report from the UE 115, that corresponds to the control message carrying the indication), the base station may delay transitioning to the new power saving mode, may retransmit the indication of the new power saving mode in a subsequent control message, etc. The described techniques may thus provide for improved power saving mode configuration and management. For example, the techniques described herein may provide for reduced communication failures (e.g., in cases where power saving modes of a base station 105 and UE 115 would otherwise become misaligned), improved power savings (e.g., for quicker adjustments to modem control parameters of a modem of the UE via retransmitted power saving mode indications based on earlier determination of missed power saving mode indications), etc.

Further, the described techniques may be applied to realize various other improvements to wireless communications system 100. For example, the described techniques may be applied, by analogy, to convey feedback for other types of control information included in PDCCH (e.g., in addition to indications of power saving modes). As an example, the techniques described herein for positive acknowledgement/negative acknowledgement information for control information may inform a base station 105 of whether or not other information included in transmitted PDCCH (e.g., in DCI) was received by the UE 115, such that the base station 105 may manage other ramifications of whether or not other control information was successfully received by the UE 115. As such, in general, the described techniques may be applied for finer granularity in UE 115 feedback reporting, such that a base station 105 may be informed of scenarios where a UE 115 is able to decode PDCCH but is not able to decode PDSCH (e.g., compared to conventional techniques where an indication of a negative acknowledgement for PDSCH may have otherwise resulted in ambiguity as to whether or not the corresponding PDCCH was successfully decoded). Generally, various improvements may be implemented based on information included in the PDCCH.

Figure 2:
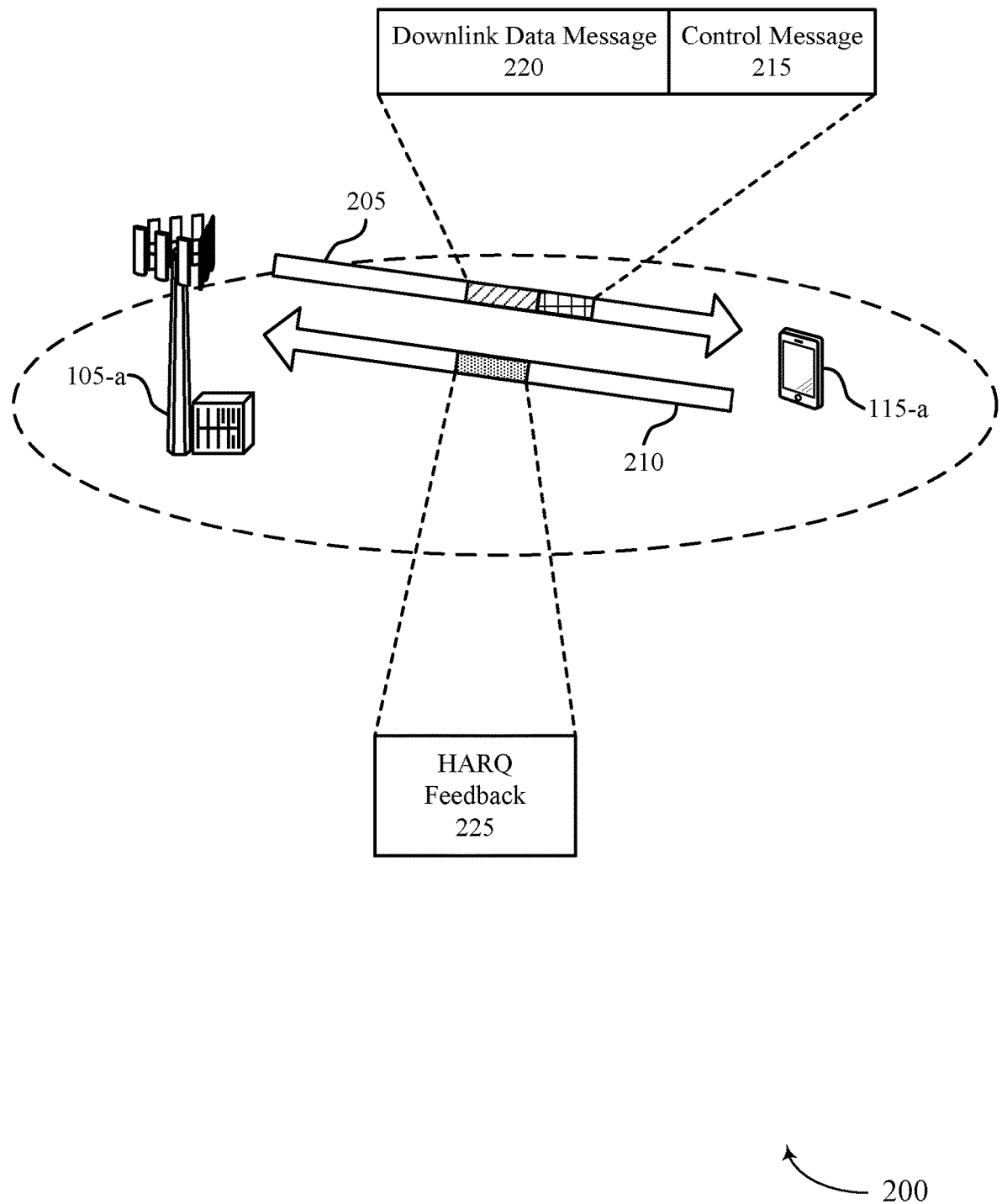
FIG. 2 illustrates an example of a wireless communications system that supports triggering power saving modes with scheduling DCI in accordance with aspects of the present disclosure.

FIG. 2 illustrates an example of a wireless communications system 200 that supports triggering power saving modes with scheduling DCI in accordance with aspects of the present disclosure. In some examples, wireless communications system 200 may implement aspects of wireless communications system 100. For example, wireless communications system 200 includes UE 115-a and base station 105-a, which may be examples of the corresponding devices described with reference to FIG. 1. Wireless communications system 200 may support UE 115-a feedback reporting for control messaging (e.g., such that base station 105-a may identify whether or not an indication of a power saving mode transmitted in a control message was successfully received by UE 115-a).

In some cases, UE 115-a and base station 105-a may communicate using one or more downlink transmissions 205 and feedback transmissions 210. For example, base station 105-a may send downlink transmissions 205 on a PDCCH and/or PDSCH. UE 115-a may receive data transmitted by base station 105-a and may send feedback transmissions 210. In some cases, downlink transmissions 205 may include one or more control messages 215 and one or more downlink data messages 220, and feedback transmissions 210 may include a feedback report, such as HARQ feedback 225 (e.g., including a HARQ-ACK codebook).

According to some aspects, UE 115-a may transmit HARQ feedback 225 to base station 105-a. For example, base station 105-*a* may send data transmissions (e.g., control messages 215 and downlink data messages 220) to UE 115-*a*. According to the techniques described herein, UE 115-*a* may use HARQ feedback 225 to ensure reception of the transmitted control information (e.g., which may include indications of power saving modes) and transmitted data information. For example, UE 115-*a* may send HARQ feedback transmissions (e.g., HARQ feedback 225) that include a positive acknowledgement or a negative acknowledgement for control messages 215 and downlink data messages 220 detected by UE 115-*a*. In such cases, UE 115-*a* may monitor for downlink transmissions 205 sent by base station 105-*a* during one or more monitoring occasions (e.g., time periods during which UE 115-*a* monitors a set of resources to identify downlink transmissions 205 sent to UE 115-*a* from base station 105-*a*).

In some cases, wireless communications system 200 may use codebook-based HARQ feedback. For example, a HARQ-ACK codebook including multiple HARQ information bits (e.g., positive acknowledgement/negative acknowledgement information, such as an ACK or a NACK, for respective control messages 215 and downlink data messages 220) may be transmitted simultaneously on a single feedback occasion. In some cases, HARQ feedback bits may be encoded in a HARQ-ACK codebook. In some examples, UE 115-*a* may transmit different types of HARQ-ACK codebooks. For instance, a semi-static codebook may be used, where a HARQ feedback bit may be reserved in a semi-static codebook of fixed size (e.g., regardless of whether a PDCCH/PDSCH transmission occurs). Additionally or alternatively, a dynamic codebook may be used. In such cases, a HARQ feedback bit may be conditionally added to a feedback transmission. For example, the HARQ feedback bit may be added or reserved in the dynamic codebook if a downlink message (such as a PDSCH transmission) is detected.

Wireless communications system 200 may support various power saving schemes (e.g., to reduce power consumption for communicating devices such as UE 115-*a*, which may be power limited, as well as base station 105-*a*). For example, wireless communications system 200 may employ power saving schemes outside DRX active time, such as implementation of wake-up signaling outside DRX active time, as discussed herein. Wireless communications system 200 may also support power saving schemes during UE 115-*a* active time (e.g., such as dynamic adaptation of UE parameters for one or more carriers). For example, wireless communications system 200 may support cross-slot scheduling adaptation (e.g., switching between same-slot scheduling and cross-slot scheduling), PDCCH monitoring adaptation (e.g., PDCCH occasion skipping or PDCCH monitoring periodicity adaptation), maximum number of MIMO layers adaptation (e.g., radio frequency (RF) components may be turned on/off depending on the number of layers maintained by base station 105-*a* and UE 115-*a*), etc.

In some examples, wireless communications system 200 may implement one or more power saving modes, and base stations 105 and a UEs 115 may communicate according to such power saving modes (e.g., where each power saving mode may be associated with varying operational characteristics, and thus varying rates of power consumption). For example, a power saving mode (e.g., power saving mode) may be associated with a minimum applicable downlink scheduling offset, a minimum downlink control channel monitoring periodicity, a maximum number of downlink MIMO layers, etc. As such, configuration of different power saving modes may configure different rates of power consumption by increasing or decreasing a number of available receive chains in a UE 115, initiating a time delay between one or more frequency scan requests performed by the UE 115 (e.g., increasing or decreasing offsets between downlink monitoring occasions), etc.

Wireless communications system 200 may support various mechanisms for triggering adaptation (e.g., power saving adaptations, such as configuring a power saving mode) during UE 115-*a* active time. In some cases, configuration of power saving modes (e.g., indication of power saving modes) may be performed via scheduling PDCCH (e.g., scheduling DCI), as DCI-based triggering may be faster and consume less overhead (e.g., compared to medium access control (MAC) control element (CE) and RRC signaling). In such cases, when UE 115-*a* receives downlink/uplink scheduling information (e.g., when UE 115-*a* receives DCI), the UE 115-*a* may also be indicated a power saving mode. One or more additional information bits may be included in scheduling DCI (e.g., in control message 215) for the indication of a power saving mode. For example, if UE 115-*a* supports N different power saving modes, a field of $M=[\log_2 N]$ bits may be added to scheduling DCI to support scheduling DCI based power saving mode indication.

When UE 115-*a* is indicated a new power saving mode, which is different from the current power saving mode, the new power saving mode may be applied for subsequent communications between the base station 105-*a* and the UE 115-*a* after some time delay. In some cases, a power saving mode may be dedicated as a default power saving mode or a fallback mode (e.g., or a no-power-saving mode), which may not apply any power saving techniques. In some examples, an application delay may apply to scheduling DCI indication of a power saving mode. In such examples, once UE 115-*a* is indicated with a new power saving mode that is different from the current mode (e.g., the power saving mode according to which the UE 115-*a* is currently operating), the new power saving mode may be applied for communications (e.g., downlink transmissions 205) between base station 105-*a* and UE 115-*a* after some time delay.

However, in some cases, the application time of the new power saving mode (e.g., indicated by scheduling PDCCH, such as control message 215) may be earlier than the HARQ feedback timing of the corresponding scheduling PDSCH. Power saving modes may thus become misaligned between UE 115-*a* and base station 105-*a* (e.g., as described in more detail herein, for example, with reference to FIG. 3).

For example, base station 105-*a* may send PDCCH (e.g., control message 215) indicating a new power saving mode in slot n. If the indication is successfully received by UE 115-*a*, both UE 115-*a* and base station 105-*a* may assume that the new mode is effective from slot n+T (e.g., there may be no misalignment). However, if the indication is not successfully received by UE 115-*a* (e.g., if UE 115-*a* misses control message 215 that includes the indication), base station 105-*a* may assume the new mode from slot n+T ($T<K_1$) and UE 115-*a* may stay in the current or old power saving mode (e.g., such that UE 115-*a* and base station 105-*a* power saving modes become misaligned).

Without implementation of the described techniques (e.g., without implementation of feedback for PDCCH), conventional systems may be limited to feedback for PDSCH. In such conventional systems, after receiving HARQ feedback in a slot $n+K_1$, base station 105-*a* may interpret that the PDCCH (e.g., with the new power saving mode indication) was successfully received by UE 115-*a* (e.g., such that there is no misalignment) if the corresponding HARQ-ACK information is '1' (e.g., 'ACK'). However, in such conventional systems, if the corresponding HARQ-ACK information is '0' (e.g., 'NACK'), base station 105-a may not be able to distinguish if PDCCH was successfully received by UE 115-a but PDSCH was missed (e.g., such that there is no misalignment, as the UE 115-a did receive the indication of the power saving mode) or if both PDCCH and PDSCH were missed by UE 115-a (e.g., such that there is a misalignment scenario). As such, the techniques described herein (e.g., separate feedback/acknowledgment of PDCCH) may be implemented to avoid such ambiguity.

In some cases, UE 115-a may detect a PDSCH transmission by blind decoding of a PDCCH with a PDSCH allocation. In other cases, UE 115-a may detect a PDCCH releasing a semi-persistently scheduled (SPS) PDSCH. In such cases, the PDCCH releasing the semi-persistently scheduled PDSCH may not involve the transmission of PDSCH, but UE 115-a may transmit an ACK to confirm detection of the PDCCH. In yet other cases, UE 115-a may detect a PDSCH transmission by detection of a semi-persistent PDSCH. In some cases, a wireless communications system may use a downlink assignment indicator (DAI), where the DAI may assign an index to a data transmission (e.g., PDSCH) that may be bundled in a HARQ-ACK codebook. In some cases, the DAI may assist the UE 115-a in identifying downlink messages that may not have been detected (e.g., transmitted via DCI). The DAI may assign an index to a data transmission (e.g., PDSCH) that may be bundled to a HARQ transmission containing one or more data transmissions. UE 115-a may use the DAI to identify a PDSCH transmission that UE 115-a may have failed to detect. As such, UE 115-a may use the DAI to construct a codebook. For example, UE 115-a may determine that a PDSCH transmission was not received based on a received DAI. UE 115-a may thus include a NACK for the missing PDSCH transmission in a constructed codebook.

Figure 3:
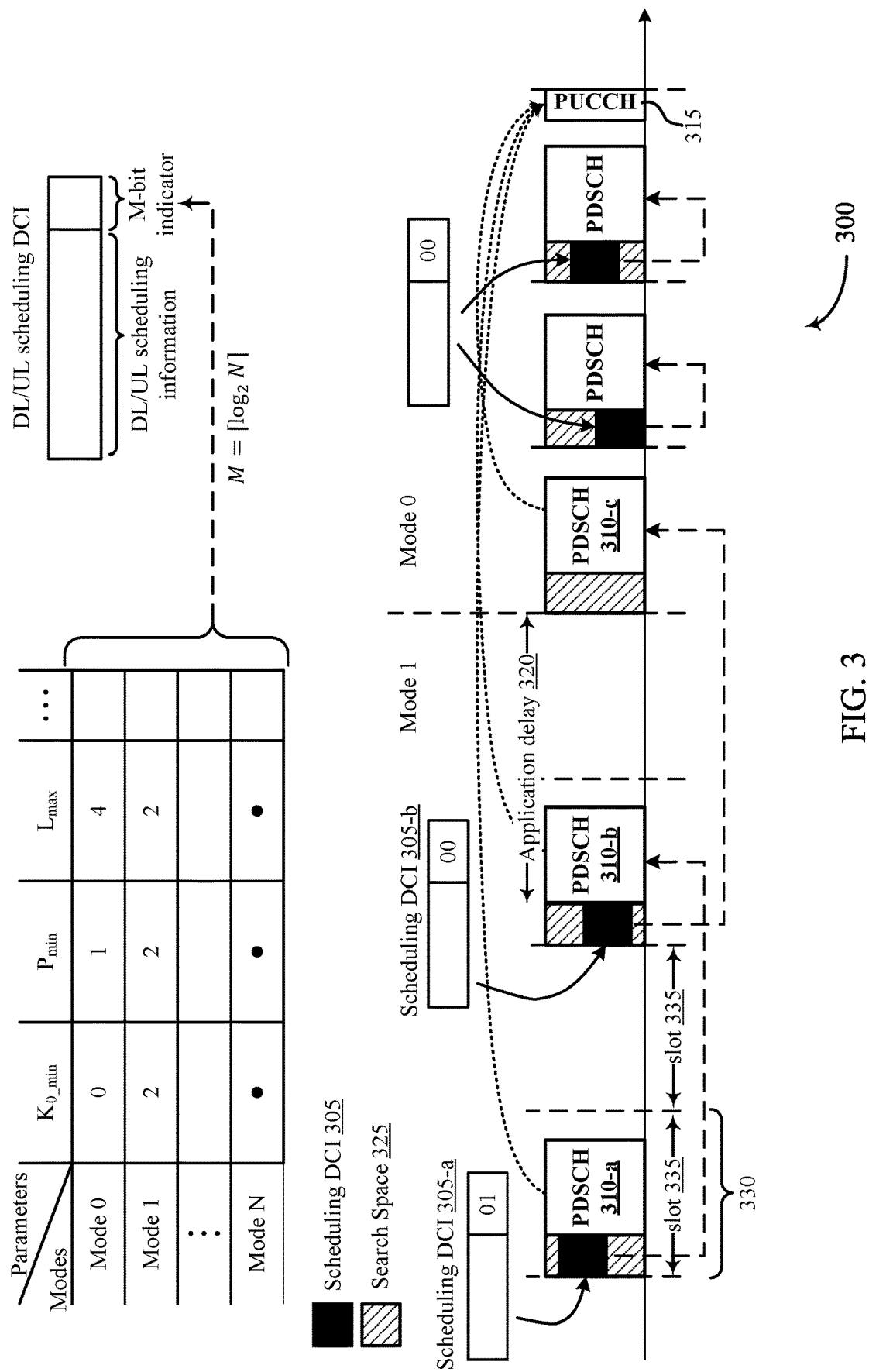
FIG. 3 illustrates an example of a control message feedback diagram that supports triggering power saving modes with scheduling DCI in accordance with aspects of the present disclosure.

FIG. 3 illustrates an example of a control message feedback diagram 300 that supports triggering power saving modes with scheduling DCI in accordance with aspects of the present disclosure. In some examples, control message feedback diagram 300 may implement aspects of wireless communications system 100 and/or wireless communications system 200. For example, control message feedback diagram 300 may illustrate base station 105 configuration of power saving modes via downlink/uplink (DL/UL) scheduling DCI 305, and UE 115 feedback reporting based on monitoring for scheduling DCI 305 and PDSCH 310 during monitoring occasions 330.

As discussed herein, configuration of power saving modes (e.g., indication of power saving modes) may be performed via scheduling PDCCH (e.g., scheduling DCI 305).

For example, a power saving mode may refer to a configuration of one or more adaptation or operational parameters, such as a minimum applicable downlink scheduling offset ($K_{0\_min}$), a minimum PDCCH monitoring periodicity ($P_{min}$) (e.g., in slots), a maximum number of downlink MIMO layers ($L_{max}$), etc. In the example of FIG. 3, power saving modes 'Mode 0,' 'Mode 1,' through 'Mode N' are shown, where each power saving mode is associated with various values of $K_{0\_min}$, $P_{min}$, and $L_{max}$. As discussed above, in cases where a UE supports N different power saving modes, a field of M=[$\log_2$ N] bits may be added to scheduling DCI 305 to enable indication of any of power saving modes 'Mode 0' through 'Mode N.' As such, downlink/uplink scheduling DCI 305 may include downlink/uplink scheduling information as well as an M-bit indicator of a power saving mode.

A base station may transmit scheduling PDCCH (e.g., scheduling DCI 305) and/or PDSCH 310 during one or more monitoring occasions 330. For example, a base station may transmit scheduling DCI 305 within some configured search space 325 during a monitoring occasion 330 (e.g., and a UE may blind decode the scheduling DCI 305 according to the configured search space 325). In the example of FIG. 3, scheduling DCI 305-a may include downlink/uplink scheduling information (e.g., time-frequency resources) for PDSCH 310-b, and scheduling DCI 305-a may also include an M-bit indicator of a power saving mode 'Mode 1.' That is, scheduling DCI 305-a may include an M-bit indicator set to a value of '01' indicating power saving mode 'Mode 1.' Further, scheduling DCI 305-b may include downlink/uplink scheduling information (e.g., time-frequency resources) for PDSCH 310-c, and scheduling DCI 305-b may also include an M-bit indicator set to a value of '00' indicating power saving mode 'Mode 0.'

As such, upon reception of scheduling DCI 305-b, a UE may identify and transition to the new power saving mode 'Mode 0' (e.g., after a time delay, such as application delay 320, following scheduling DCI 305-b). After the application delay 320, a base station 105 and UE 115 may operate according to 'Mode 0.' For example, 'Mode 1' may be associated with $P_{min}$=2, such that monitoring occasions 330 are configured every other slot 335 (e.g., every 2 slots). Upon indication of power saving mode 'Mode 0' via scheduling DCI 305-b, 'Mode 1' may be employed where 'Mode 1' is associated with $P_{min}$=1, such that monitoring occasions 330 are configured every slot 335. As such, a base station may indicate 'Mode 1' for increased power savings (e.g., as a UE may power down at least some RF circuitry during intermediate slots not associated with a monitoring occasion 330), may indicate 'Mode 0' for increased performance (e.g., increased throughput to the UE), etc.

As discussed herein, wireless communications systems may employ HARQ feedback for scheduling DCI 305 and PDSCH 310. In some examples, a HARQ-ACK codebook may include multiple HARQ information bits (e.g., ACK/NACKs for respective control messages, such as scheduling DCI 305, and downlink data messages, such as PDSCHs 310) that may be transmitted simultaneously on a single feedback occasion 315 (e.g., a PUCCH occasion). In the example of FIG. 3, feedback corresponding to scheduling DCI 305-a, PDSCH 310-a, DCI 305-b, PDSCH 310-b, and PDSCH 310-c may be transmitted simultaneously (e.g., in a HARQ-ACK codebook) on feedback occasion 315.

As such, using the techniques described herein, a wireless communications system (e.g., a base station) may more effectively handle scenarios where a base station and UE have misaligned power saving modes (e.g., when a UE misses a scheduling DCI 305-b that indicates a new power saving mode). For example, in cases where a UE misses scheduling DCI 305-b, the UE may remain in an old power saving mode ('Mode 1') after an application delay 320 while a base station may assume the UE has receive the indication of power saving mode 'Mode 0' (e.g., and the base station 105 may transition to the 'Mode 0' resulting in misaligned power saving modes after the application delay 320). According to the techniques described herein, the base station may become aware of the misalignment upon receiving the feedback reporting during feedback occasion 315. As such, the base station may default back to an old or previous power saving mode to reconcile timing, spatial layers, etc. with the UE.

In some cases, a base station may use information of the timing of feedback occasion 315 to configure power saving modes. For example, in some cases, a base station may configure an extended application delay 320 such that the application delay exceeds beyond the feedback occasion 315 (e.g., such that the base station may become aware of whether an indication of a power saving mode was successfully received prior to the application time). Additionally or alternatively, a base station may delay configuring a new power saving mode until a last scheduling DCI 305 associated with a feedback occasion 315 (e.g., such that the application delay 320 is set to expire as close to or after the feedback occasion 315). Additionally or alternatively, a wireless communications system may configure application of power saving modes such that any new power saving mode is not applied until after feedback occasion 315, until after some application delay 320 after feedback occasion 315, etc.

Figure 4A:
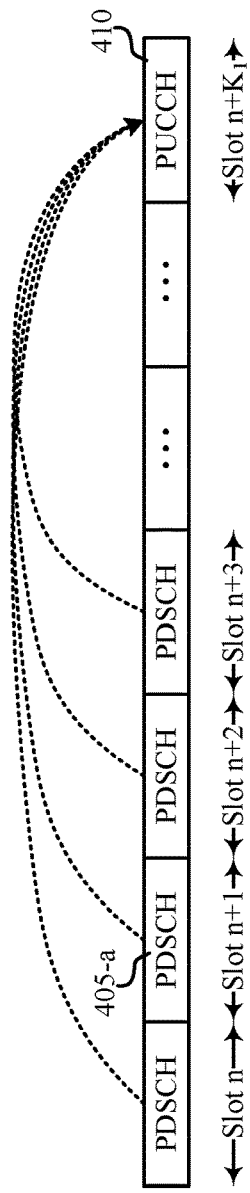
FIGS. 4A and 4B illustrate examples of feedback configurations that support triggering power saving modes with scheduling DCI in accordance with aspects of the present disclosure.
Figure 4B:
Figure 4B:
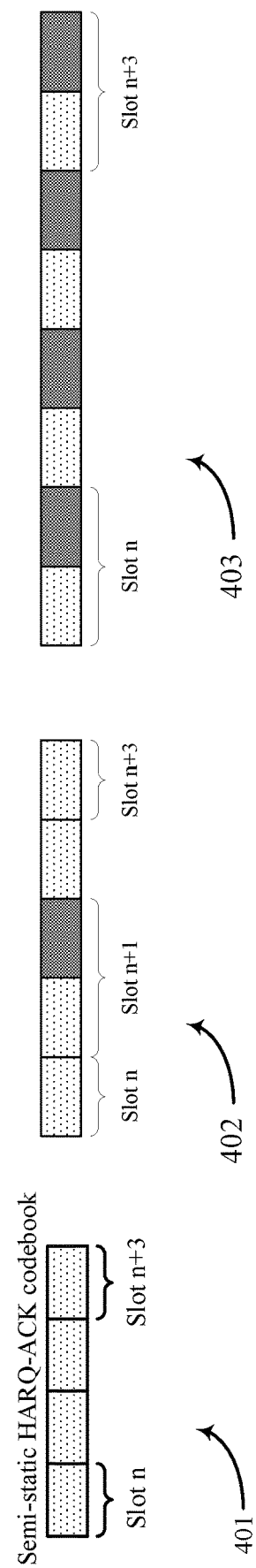

FIG. 4A illustrates an example of a feedback configuration 400 that supports triggering power saving modes with scheduling DCI in accordance with aspects of the present disclosure. In some examples, feedback configuration 400 may implement aspects of wireless communications system 100 and/or wireless communications system 200. Further, FIG. 4B illustrates example feedback configuration 401, example feedback configuration 402, and example feedback configuration 403 that support triggering power saving modes with scheduling DCI in accordance with aspects of the present disclosure. In some examples, feedback configurations 401 through 403 may implement aspects of wireless communications system 100 and/or wireless communications system 200. For instance, feedback configurations 401 through 403 may illustrate communications between a UE 115 and a base station 105, which may be examples of a UE 115 and base station 105, respectively, described with reference to FIGS. 1 and 2. Downlink transmission occasions and corresponding feedback reporting illustrated in FIG. 4A, as well as example feedback formatting (e.g., feedback codebooks) illustrated in FIG. 4B, may employ feedback (e.g., ACK/NACK) corresponding to control improve the reliability and accuracy or synchronization of power saving mode configuration via scheduling DCI.

Wireless communications systems may employ semi-static (e.g., Type-1) codebook based downlink HARQ feedback. In such cases, for a PDSCH 405 scheduled in a slot n, HARQ feedback may be transmitted in a slot $n+K_1$ via uplink (e.g., through PUCCH 410). PDSCH-to-HARQ feedback timing, $K_1$, may be indicated by the scheduling PDCCH. HARQ-ACK information bits with the same HARQ timing (e.g., with the same indicated slot $n+K_1$) are aggregated in a HARQ-ACK codebook and transmitted via PUCCH 410 (e.g., in the example of FIG. 3, scheduling DCI 305-a and scheduling DCI 305-b may indicate $K_1$ values such that feedback for PDSCH 310-b and PDSCH 310-c is transmitted in a same feedback occasion 315).

If PDSCH is not scheduled in a slot n, the corresponding bit in the HARQ-ACK codebook is '0' (e.g., a 'NACK'). For example, a UE may indicate an information bit of value '0' (e.g., a 'NACK') as either the base station did not send any scheduling PDCCH or the UE missed the PDCCH. In some cases, application time of the new power saving mode (e.g., indicated by scheduling PDCCH) may be earlier than the HARQ feedback timing of the corresponding scheduled PDSCH.

FIG. 4B may illustrate feedback configurations 401 through 403 (e.g., HARQ-ACK codebooks) that may be implemented for feedback corresponding to the example of FIG. 4A. For example, feedback configuration 401 may illustrate a feedback bit corresponding to each slot (e.g., or monitoring occasion) of PDSCH. As discussed herein, such may result in ambiguity associated with whether or not an indication of a power saving mode was received (e.g., as feedback configuration 401 may not provide for separate PDCCH/power mode change feedback). For example, in cases where each candidate PDSCH occasion has one bit HARQ-ACK information, Table 1 may illustrate scenarios that may be represented by HARQ-ACK information.

TABLE 1

| Case | HARQ-ACK Information |
|---|---|
| PDSCH decoded successfully | 1 |
| PDSCH decoding failed (PDCCH received) -or- PDSCH decoding failed (PDCCH not received) | 0 |

Feedback configurations 402 and 403 may include separate acknowledgement of PDCCH (e.g., separate acknowledgement of scheduling PDCCH, scheduling DCI, power mode change indication, etc.).

In example feedback configuration 403, for HARQ-ACK information for each candidate PDSCH occasion corresponding to a PUCCH for HARQ-ACK feedback, an additional one bit may be added for acknowledgement for PDCCH reception. In some examples, HARQ-ACK information for PDCCH for semi-persistent scheduling (SPS) PDSCH release may also have one additional bit, if the PDCCH also includes a field for power saving mode indication. In some other examples, HARQ-ACK information for SPS PDSCH may not have one additional bit, because SPS PDSCH may not have scheduling PDCCH. The additional one bit may be used to acknowledge the successful reception of the PDCCH scheduling the PDSCH (e.g., each candidate PDSCH occasion may have one bit for HARQ-ACK for the PDSCH as well as an additional bit for HARQ-ACK for the PDCCH scheduling the PDSCH (e.g., two information bits may correspond to each PDSCH occasion, where a first bit corresponds to the PDSCH and the second bit corresponds to PDCCH scheduling the PDSCH). Table 2 may illustrate scenarios that may be represented by such HARQ-ACK information.

TABLE 2

| Cases | HARQ-ACK Information |
|---|---|
| PDSCH decoded successfully | 11 |
| PDSCH decoding failed (PDCCH received) | 01 |
| PDSCH not scheduled/received (PDCCH not received) | 00 |

In example feedback configuration 402, for HARQ-ACK information for each candidate PDSCH occasion corresponding to a PUCCH for HARQ-ACK feedback, an additional one bit may be added only when PDSCH is scheduled by a PDCCH indicating a new power saving mode (e.g., a new power saving mode different from a current power saving mode of the UE). For PDSCH scheduled by a PDCCH without a power saving mode change, a traditional 1-bit HARQ-ACK may be used. Additionally or alternatively, an additional bit may be added only when HARQ-ACK feedback for a given PDSCH is 'NACK.' In some cases, compared to example feedback configuration 403, example feedback configuration 402 may save or reduce HARQ feedback payload size. For example, in the example of FIG. 4A, if only slot n+1 is scheduled by a PDCCH with a power saving mode switching indication, example feedback configuration 402 may include 5 information bits with two information bits corresponding to the slot n+1 (e.g., where a first bit corresponds to the PDSCH and the second bit corresponds to PDCCH scheduling the PDSCH). Table 3 may illustrate scenarios that may be represented by such HARQ-ACK information.

TABLE 3

| Cases | HARQ-ACK Information |
|---|---|
| PDSCH decoded successfully | 1 |
| PDSCH decoding failed (PDCCH received) | 01 |
| PDSCH not scheduled/received (PDCCH not received) | 0 |

In such cases where HARQ-ACK information for each candidate PDSCH occasion corresponds to a PUCCH for HARQ-ACK feedback, an additional one bit may be added only when PDSCH is scheduled by a PDCCH indicating a new power saving mode (e.g., such as exemplified by example feedback configuration 402). A base station may perform blind decoding with different HARQ-ACK codebook sizes. A base station may receive a HARQ-ACK codebook and, in some cases, may expect a different size, and may accordingly assume various hypotheses of different codebook sizes and configurations (e.g., ordering) for blind decoding. Such an assumption may enable the base station to decode HARQ feedback bits for downlink transmissions from a UE's transmitted HARQ-ACK codebook.

For example, a base station may assume there are R candidate PDSCH occasions corresponding to a PUCCH for HARQ-ACK feedback. If the base station does not trigger any power saving mode switch, when scheduling any of those R candidate PDSCH occasions, the base station may expect R-bits as the HARQ-ACK codebook size. If the base station triggers one power saving mode switch when scheduling any of those R candidate PDSCH occasions, the base station may test one or more hypotheses. For example, the base station may try:

Hypothesis 1: UE successfully decoded the scheduling DCI, thus knows the mode switch, although it failed in decoding the scheduled PDSCH (e.g., such that, due to the additional one bit for the failed PDSCH decoding, the codebook size will be R+1 bits)

Hypothesis 2: Either UE successfully decoded both the scheduling DCI and the scheduled PDSCH, or UE failed in decoding the scheduling DCI (e.g., such that the codebook size will be R bits)

If the base station triggers more than one power saving mode switches when scheduling any of those R candidate PDSCH occasions, the number of hypotheses that the base station may use or test to perform blind decoding may increase. In some cases, to avoid extensive decoding complexity and ambiguity, the number of power saving mode changes per PUCCH occasion may be restricted (e.g., such as to one potential power saving mode change per HARQ-ACK feedback).

In some examples, the acknowledgement for the successful decoding of the PDCCH indicating a new power saving mode may be implicit. For example, instead of adding one additional bit in the feedback reporting codebook, the original feedback configuration 401 may be used. However, the acknowledgement of the new power saving mode (e.g., acknowledgement of successful decoding of the scheduling PDCCH) can be made by modifying the waveform for uplink feedback signaling. For example, implicit PDCCH acknowledgement may be performed via uplink resource selection (e.g., if a UE decoded a PDCCH indicating a new power saving mode, it can report HARQ codebook through PUCCH resource #1, otherwise, it can report through PUCCH resource #2), scrambling sequence selection (e.g., a UE may use a first scrambling sequence to indicate the UE decoded a PDCCH indicating a new power saving mode, otherwise, the UE may use a second scrambling sequence), and/or encoding of HARQ-ACK information (e.g., CRC selection). In such examples, a base station may perform blind decoding for different waveform or encoding hypotheses.

Figure 5:
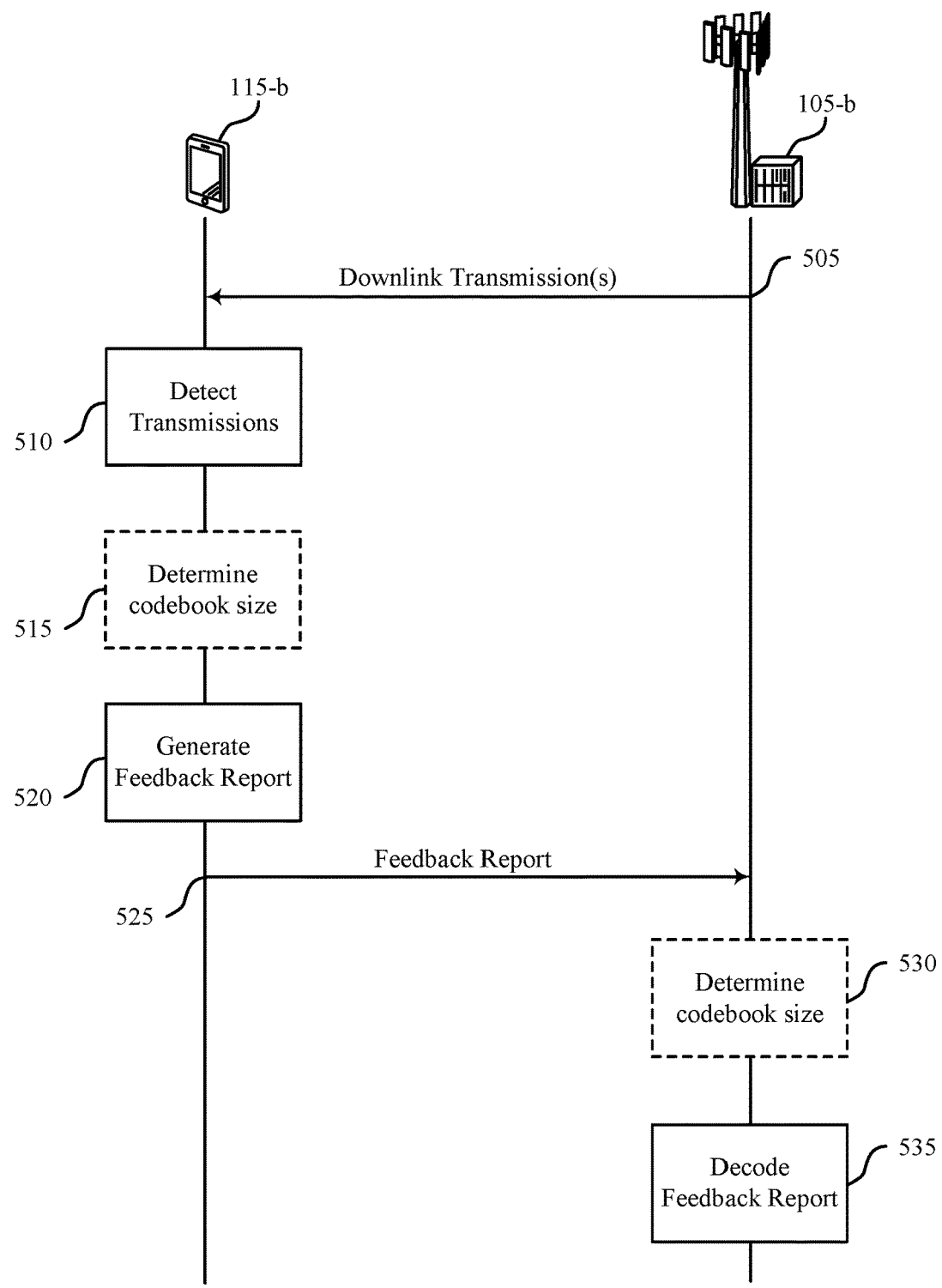
FIG. 5 illustrates an example of a process flow that supports triggering power saving modes with scheduling DCI in accordance with aspects of the present disclosure.

FIG. 5 illustrates an example of a process flow 500 that supports triggering power saving modes with scheduling DCI in accordance with aspects of the present disclosure. In some examples, process flow 500 may implement aspects of wireless communications system 100 and/or wireless communications system 200. In the following description of the process flow 500, the operations between UE 115-b and base station 105-b may be transmitted in a different order than the order shown, or the operations performed by base station 105-b and UE 115-b may be performed in different orders or at different times. Certain operations may also be left out of the process flow 500, or other operations may be added to the process flow 500. It is to be understood that while base station 105-b and UE 115-b are shown performing a number of the operations of process flow 500, any wireless device may perform the operations shown.

At 505, base station 105-b may transmit one or more downlink transmissions (e.g., which may include one or more scheduling PDCCHs and one or more PDSCHs) to UE 115-b. For example, the downlink transmissions may include a scheduling PDCCH with a PDSCH allocation, or a PDCCH releasing a semi-persistently-scheduled PDSCH, or a semi-persistent PDSCH, or any combination thereof. Further, downlink transmissions may be transmitted during one or more transmitting times that may correspond to monitoring occasions used by UE 115-b to search for the downlink transmissions. As such, at 505, UE 115-b may monitor for a downlink data message (e.g., a PDSCH that may be scheduled by a scheduling control message or a scheduling PDCCH) during such a scheduled or configured monitoring occasion.

At 510, UE 115-b may attempt to detect the downlink transmissions. For example, UE 115-b may detect or miss a downlink data message (e.g., PDSCH transmission) based on the monitoring (e.g., UE 115-b may determine whether a downlink data message was detected for a given monitoring occasion). As discussed herein, such detection may be performed for several downlink data messages across several monitoring occasions (e.g., where a HARQ-ACK codebook may correspond to the several monitoring occasions, as indicated by scheduling DCI).

At 515, in some examples, UE 115-b may determine a codebook size based on the detections at 510. For example, when an additional bit is added to HARQ-ACK codebook only when PDSCH is scheduled by a PDCCH indicating a new power saving mode, when an additional bit is added to HARQ-ACK codebook only when PDSCH is missed, etc., UE 115-b may determine a codebook size accordingly based on what was detected at 510.

At 520, UE 115-b may generate, based on the detection at 510 (e.g., and, in some cases, the codebook size determined at 515), a feedback report (e.g., a HARQ-ACK codebook). As discussed herein, the feedback report may include a first information bit for downlink data message feedback corresponding to a downlink data message and a second information bit for control information feedback corresponding to a control message associated with the downlink data message.

For example, in some cases, UE 115-*b* may determine a first information bit based on whether a downlink data message (e.g., PDSCH) was successfully decoded and determine a second information bit based on whether a control message (e.g., PDCCH scheduling the PDSCH) was successfully decoded. In some cases, UE 115-*b* may decode the control message, where the control message includes an indication of a power saving mode, and UE 115-*b* may transition to the power saving mode based on the indication (e.g., in such cases, the second information bit may be indicative of successful decoding of the indication). In some cases, presence of the second information bit in the feedback report may be indicative that the control message includes the indication of the power saving mode.

In cases where the downlink data message was missed but the corresponding control message was successfully decoded, the first information bit may include a negative acknowledgement corresponding to the missed downlink data message and the second information bit may include a positive acknowledgement corresponding to the decoding of the control message. In cases where both the control message and the downlink data message were missed, the first information bit may include a first negative acknowledgement corresponding to the missed downlink data message and the second information bit may include a second negative acknowledgement corresponding to the missed control message.

In other examples, as discussed herein, transmission of the feedback report may implicitly indicate acknowledgement (e.g., or negative acknowledgement) for decoding of the PDCCH indicating a new power saving mode. For example, instead of adding one additional bit in the feedback reporting codebook, the feedback report may be generated to implicitly ACK/NACK the new power saving mode. For example, acknowledgement of successful decoding of the scheduling PDCCH may be performed by modifying the waveform for uplink feedback signaling. For example, implicit PDCCH acknowledgement may be performed via uplink resource selection (e.g., if UE 115-*b* decoded a PDCCH indicating a new power saving mode, UE 115-*b* may report HARQ codebook through PUCCH resource #1, otherwise, UE 115-*b* may report through PUCCH resource #2), scrambling sequence selection (e.g., UE 115-*b* may use a first scrambling sequence to indicate the UE 115-*b* decoded a PDCCH indicating a new power saving mode, otherwise, UE 115-*b* may use a second scrambling sequence), and/or encoding of HARQ-ACK information (e.g., CRC selection). In such examples, base station 105-*b* (e.g., at 535) may perform blind decoding for different waveform or encoding hypotheses.

At 525, UE 115-*b* may transmit, to base station 105-*b*, the generated feedback report. In some cases, the feedback report (e.g., HARQ-ACK codebook) may be transmitted over uplink resources (e.g., an uplink feedback report occasion, PUCCH).

At 530, base station 105-*b* may, in some cases, determine the size of the constructed codebook. For example, as discussed herein, base station 105-*b* may perform blind decoding according to one or more hypotheses based on how many power saving mode indications were transmitted for a given uplink feedback report occasion. For example, base station 105-*b* may prepare to decode the received feedback report based on a blind decoding operation, where the blind decoding operation is performed using one or more codebook sizes. In some cases, a first codebook size of the one or more codebook sizes is based on one or both of a number of monitoring occasions (R) configured by the base station 105-*b* and the control message including the indication of the power saving mode. In some cases, codebook sizes may be based on a maximum number of power saving mode indications per uplink feedback report occasion.

At 535, base station 105-*b* may decode the feedback report. In some cases, base station 105-*b* may determine whether or not UE 115-*b* successfully received a power saving mode indication based on feedback, included in the feedback report, corresponding to a control message that carried the indication. In some examples, base station 105-*b* may transition to the power saving mode based on the feedback report, where the feedback report indicates the UE successfully decoded the control message including the indication of the power saving mode. In other examples, base station 105-*b* may determine to remain in a current power saving mode based on the feedback report, where the feedback report indicates that the UE missed the control message including the indication of the power saving mode.

Figure 6:
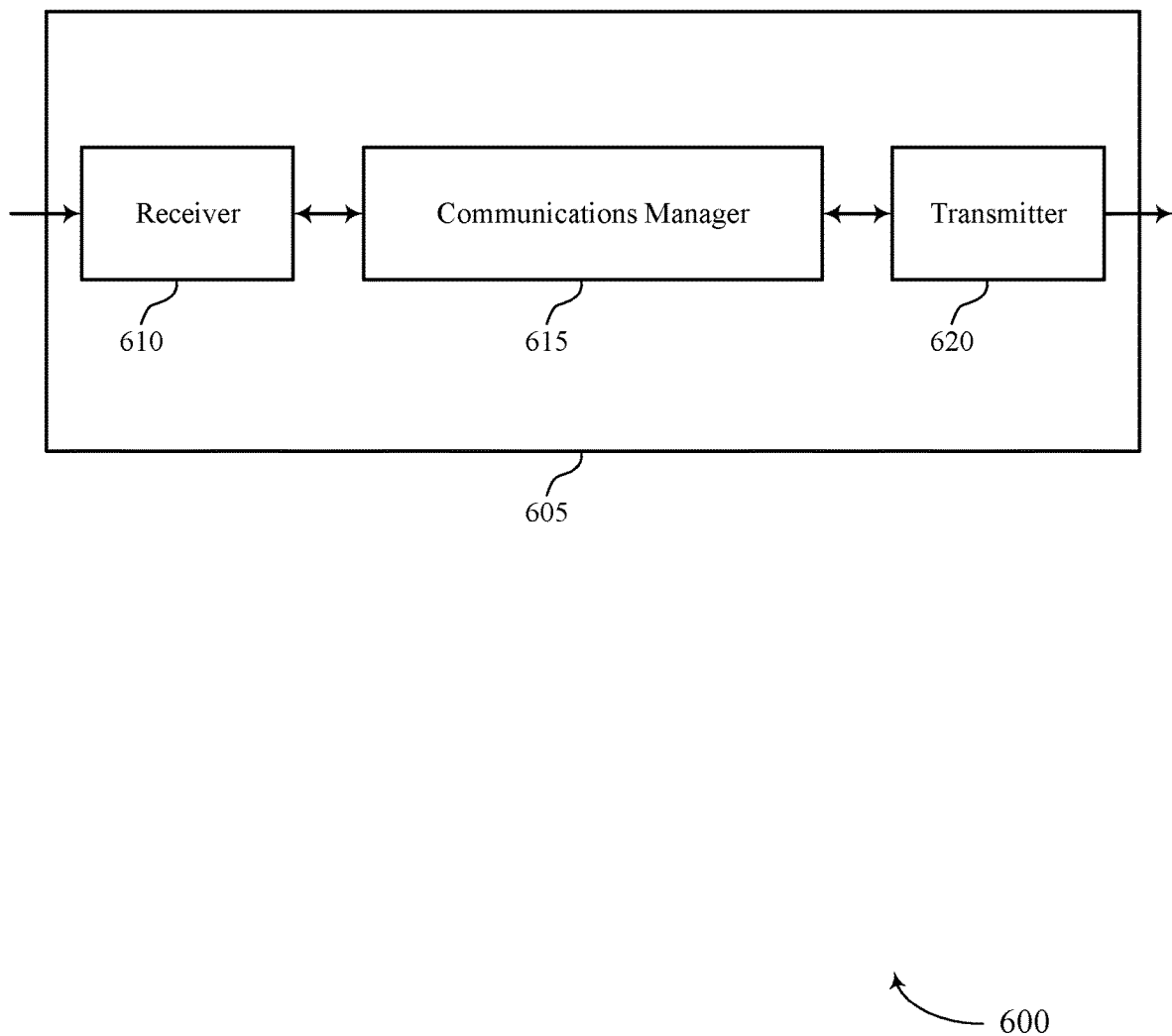
FIGS. 6 and 7 show block diagrams of devices that support triggering power saving modes with scheduling DCI in accordance with aspects of the present disclosure.

FIG. 6 shows a block diagram 600 of a device 605 that supports triggering power saving modes with scheduling DCI in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to triggering power saving modes with scheduling DCIDCI, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may monitor for a downlink data message during a scheduled monitoring occasion, generate, based on the monitoring, a feedback report including a first information bit for downlink data message feedback corresponding to the downlink data message, where the feedback report or a transmission of the feedback report is indicative, separate from the first information bit, of control information feedback corresponding to a control message associated with the downlink data message, and transmit the feedback report to a base station. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
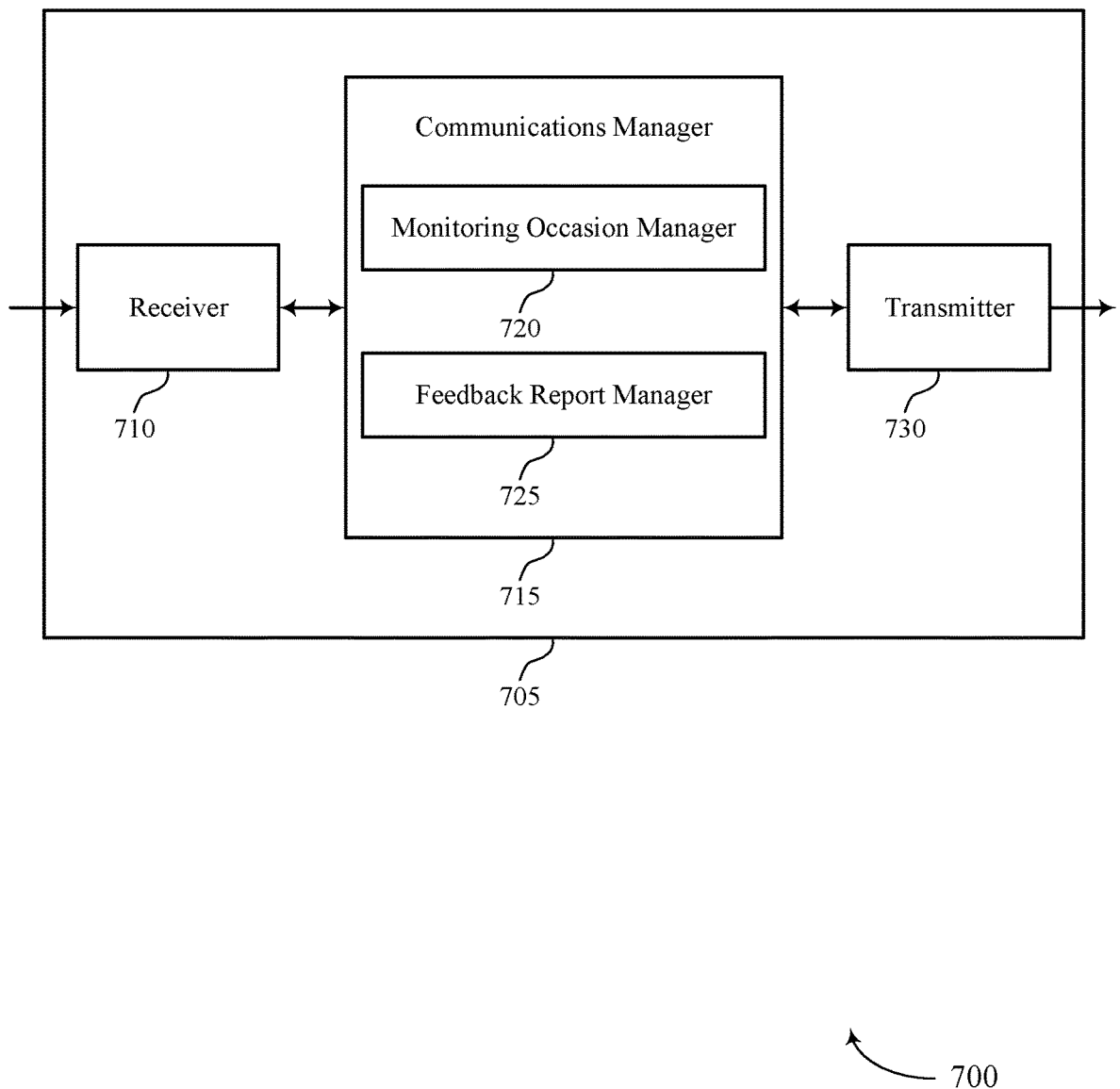

FIG. 7 shows a block diagram 700 of a device 705 that supports triggering power saving modes with scheduling DCI in accordance with aspects of the present disclosure. The device 705 may be an example of aspects of a device 605, or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to triggering power saving modes with scheduling DCI, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a monitoring occasion manager 720 and a feedback report manager 725. The communications manager 715 may be an example of aspects of the communications manager 910 described herein.

The monitoring occasion manager 720 may monitor for a downlink data message during a scheduled monitoring occasion. The feedback report manager 725 may generate, based on the monitoring, a feedback report including a first information bit for downlink data message feedback corresponding to the downlink data message, where the feedback report or a transmission of the feedback report is indicative, separate from the first information bit, of control information feedback corresponding to a control message associated with the downlink data message and transmit the feedback report to a base station.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
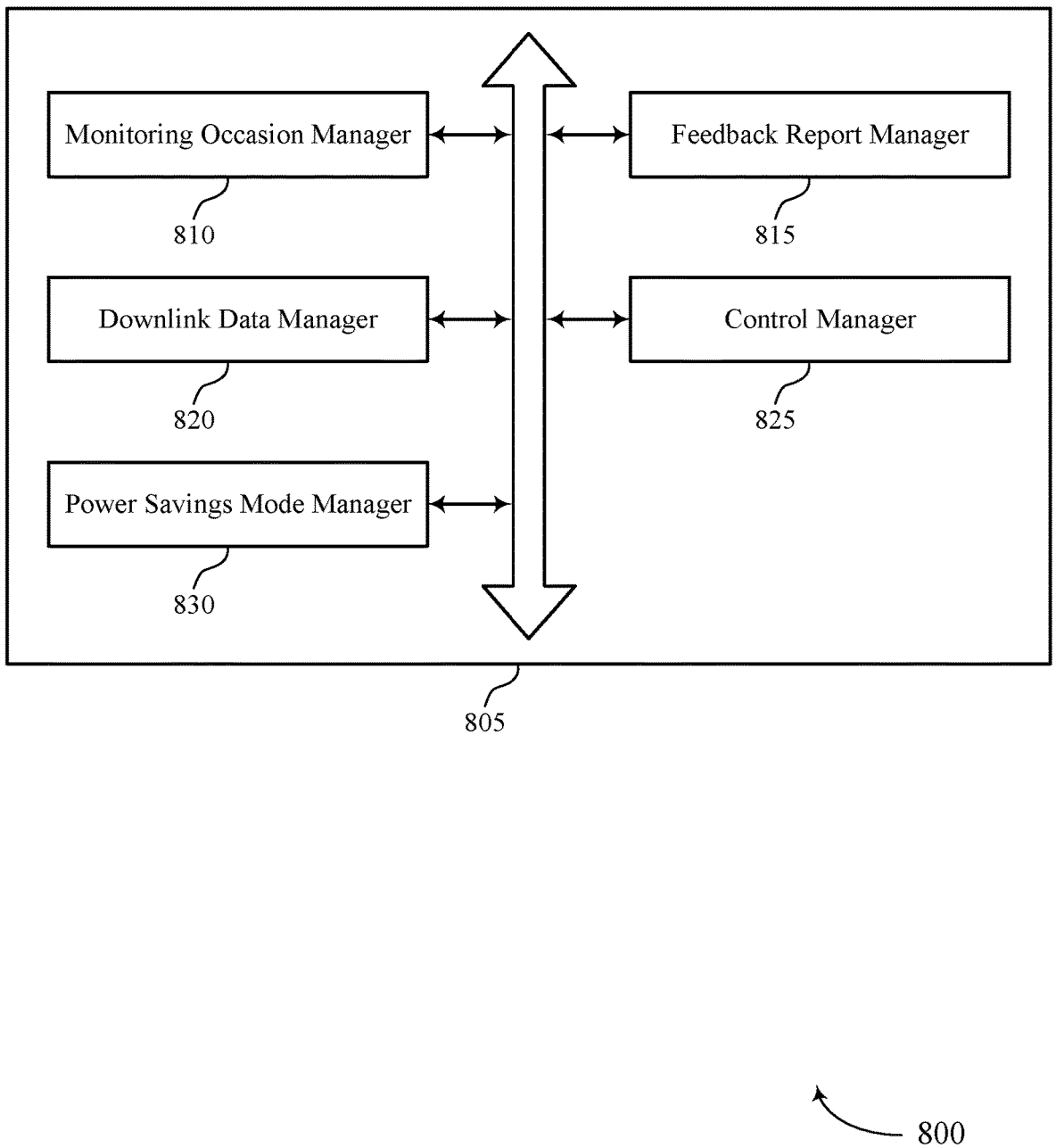
FIG. 8 shows a block diagram of a communications manager that supports triggering power saving modes with scheduling DCI in accordance with aspects of the present disclosure.

FIG. 8 shows a block diagram 800 of a communications manager 805 that supports triggering power saving modes with scheduling DCI in accordance with aspects of the present disclosure. The communications manager 805 may be an example of aspects of a communications manager 615, a communications manager 715, or a communications manager 910 described herein. The communications manager 805 may include a monitoring occasion manager 810, a feedback report manager 815, a downlink data manager 820, a control manager 825, and a power savings mode manager 830. Each of these modules may communicate, directly or indirectly, with one another (e.g., via one or more buses).

The monitoring occasion manager 810 may monitor for a downlink data message during a scheduled monitoring occasion.

The feedback report manager 815 may generate, based on the monitoring, a feedback report including a first information bit for downlink data message feedback corresponding to the downlink data message, where the feedback report or a transmission of the feedback report is indicative, separate from the first information bit, of control information feedback corresponding to a control message associated with the downlink data message. In some examples, the feedback report manager 815 may transmit the feedback report to a base station. In some examples, the feedback report manager 815 may determine that both the control message and the downlink data message were missed, where the first information bit and the second information bit indicate that the downlink data message and the control message were missed, respectively.

In some examples, the feedback report manager 815 may determine a waveform, an uplink resource, a scrambling sequence, a cyclic redundancy check encoding sequence, or some combination thereof based on whether the control message was successfully decoded, where the feedback report is indicative of the control information feedback based on the feedback report being transmitted using the waveform, the uplink resource, the scrambling sequence, the cyclic redundancy check encoding sequence, or some combination thereof. In some cases, the first information bit includes a first negative acknowledgement corresponding to the missed downlink data message and the second information bit includes a second negative acknowledgement corresponding to the missed control message. In some cases, the feedback report includes a hybrid automatic repeat request feedback report that includes positive acknowledgement/negative acknowledgement information conveyed by the first information bit and the second information bit.

The downlink data manager 820 may determine the first information bit based on whether the downlink data message was successfully decoded. In some examples, decoding the downlink data message based on the monitoring, where the first information bit includes a first acknowledgement corresponding to the decoding of the downlink data message and the second information bit includes a second acknowledgement corresponding to the decoding of the control message. In some examples, the downlink data manager 820 may determine that the downlink data message was missed based on the monitoring, where the first information bit indicates that the downlink data message was missed. In some examples, presence of the second information bit in the feedback report is based on the determination that the downlink data message was missed even though the control message was successfully decoded. In some cases, the first information bit includes a negative acknowledgement corresponding to the missed downlink data message and the second information bit includes a positive acknowledgement corresponding to the decoding of the control message.

The control manager 825 may determine a second information bit based on whether the control message was successfully decoded, where the feedback report is indicative of the control information feedback by including the second information bit for the control information feedback.

In some examples, decoding the control message, where the control message includes an indication of a power savings mode.

The power savings mode manager 830 may transition to the power savings mode based on the indication, where the second information bit is indicative of successful decoding of the indication. In some examples, presence of the second information bit in the feedback report is indicative that the control message includes the indication of the power savings mode.

Figure 9:
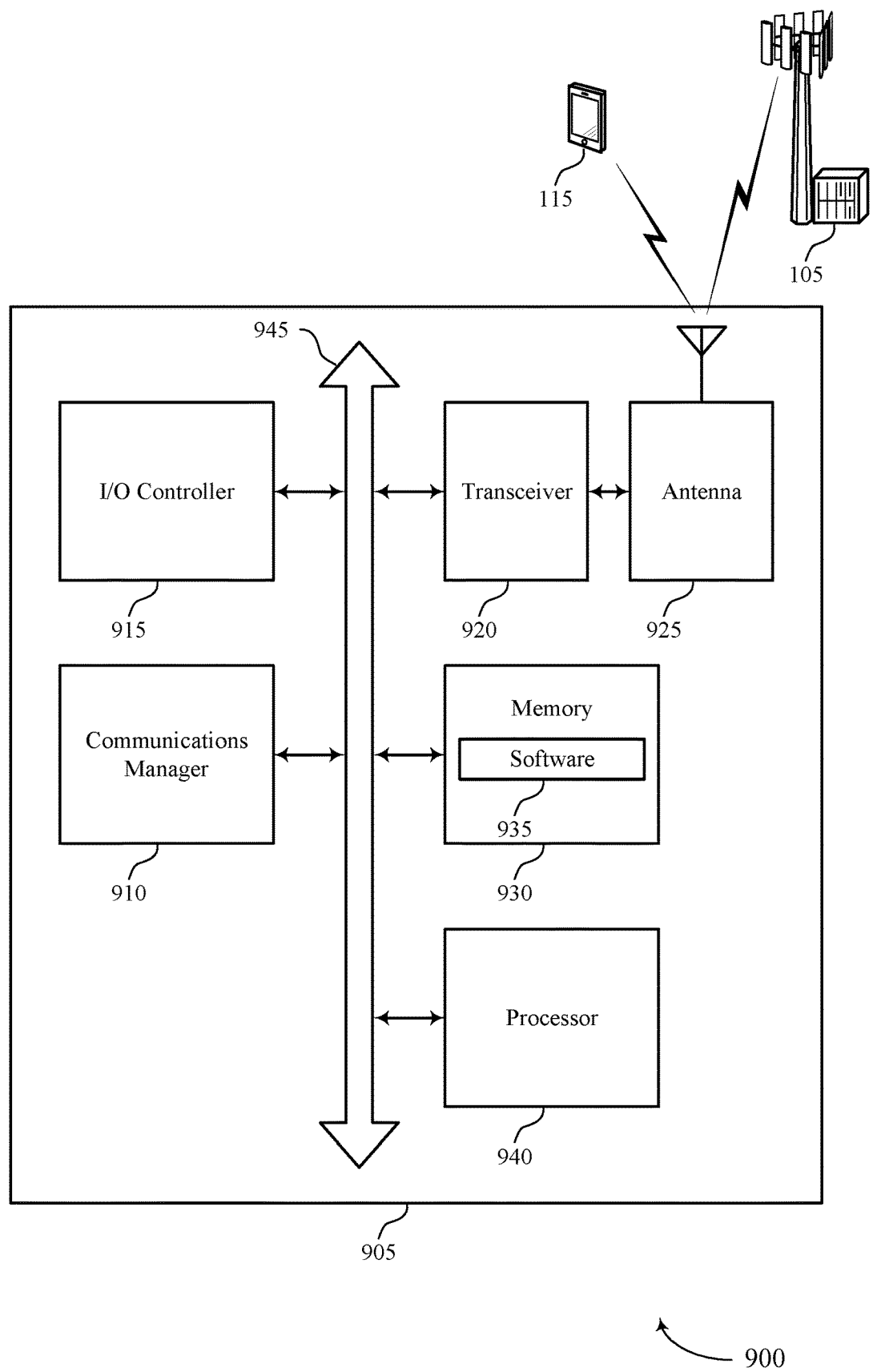
FIG. 9 shows a diagram of a system including a device that supports triggering power saving modes with scheduling DCI in accordance with aspects of the present disclosure.

FIG. 9 shows a diagram of a system 900 including a device 905 that supports triggering power saving modes with scheduling DCI in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may monitor for a downlink data message during a scheduled monitoring occasion, generate, based on the monitoring, a feedback report including a first information bit for downlink data message feedback corresponding to the downlink data message, where the feedback report or a transmission of the feedback report is indicative, separate from the first information bit, of control information feedback corresponding to a control message associated with the downlink data message, and transmit the feedback report to a base station.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver.

The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code or software 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting triggering power saving modes with scheduling DCI).

The software 935 may include instructions to implement aspects of the present disclosure, including instructions to support wireless communications. The software 935 may be stored in a non-transitory computer-readable medium such as system memory or other type of memory. In some cases, the software 935 may not be directly executable by the processor 940 but may cause a computer (e.g., when compiled and executed) to perform functions described herein.

Figure 10:
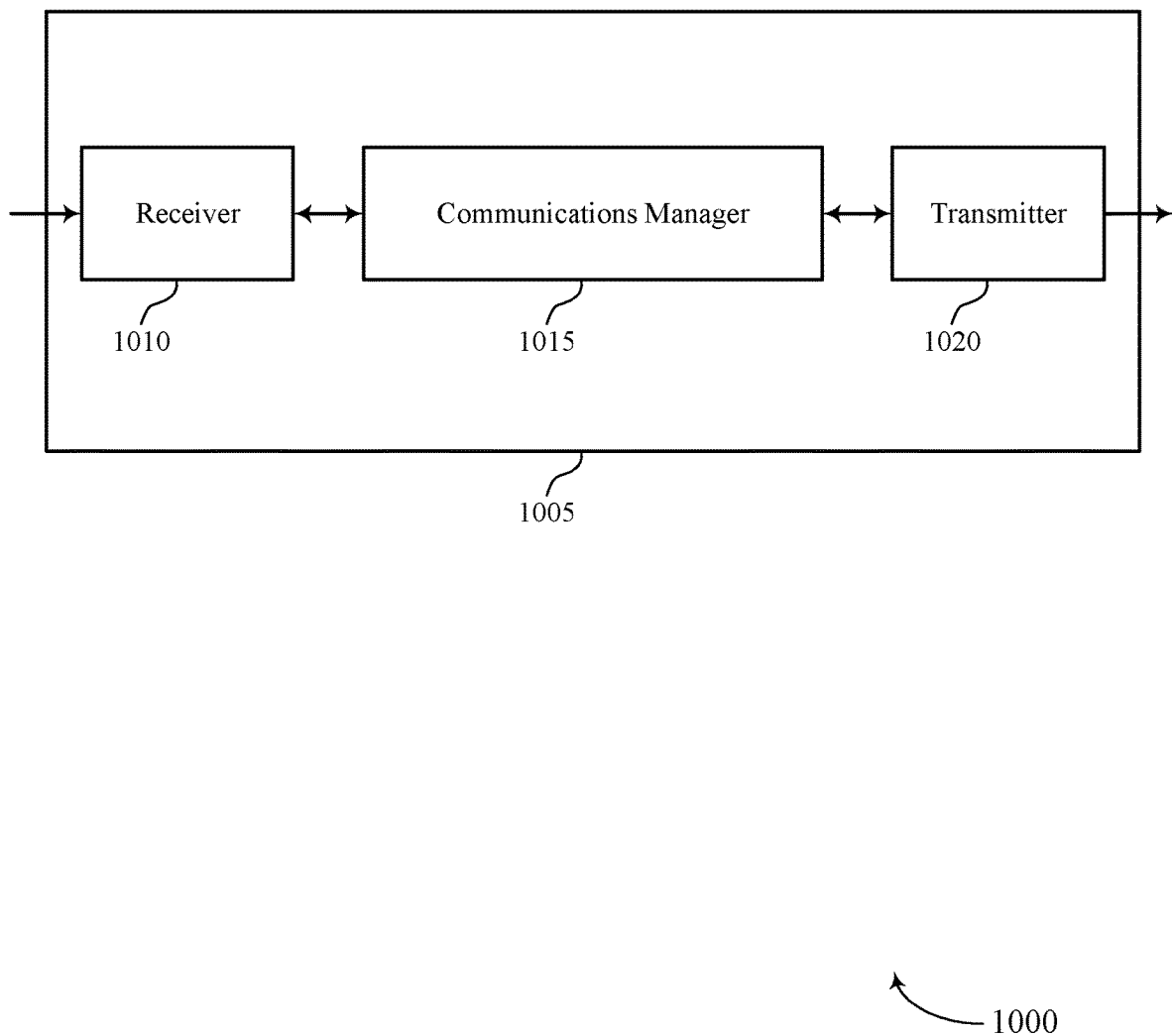
FIGS. 10 and 11 show block diagrams of devices that support triggering power saving modes with scheduling DCI in accordance with aspects of the present disclosure.

FIG. 10 shows a block diagram 1000 of a device 1005 that supports triggering power saving modes with scheduling DCI in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to triggering power saving modes with scheduling DCI, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a control message associated with a downlink data message, where the control message includes an indication of a power savings mode to be applied by the UE, transmit the downlink data message to the UE, and receive, from the UE, a feedback report including a first information bit for downlink data message feedback corresponding to the downlink data message, where the feedback report is indicative, separate from the first information bit, of control information feedback corresponding to the control message. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
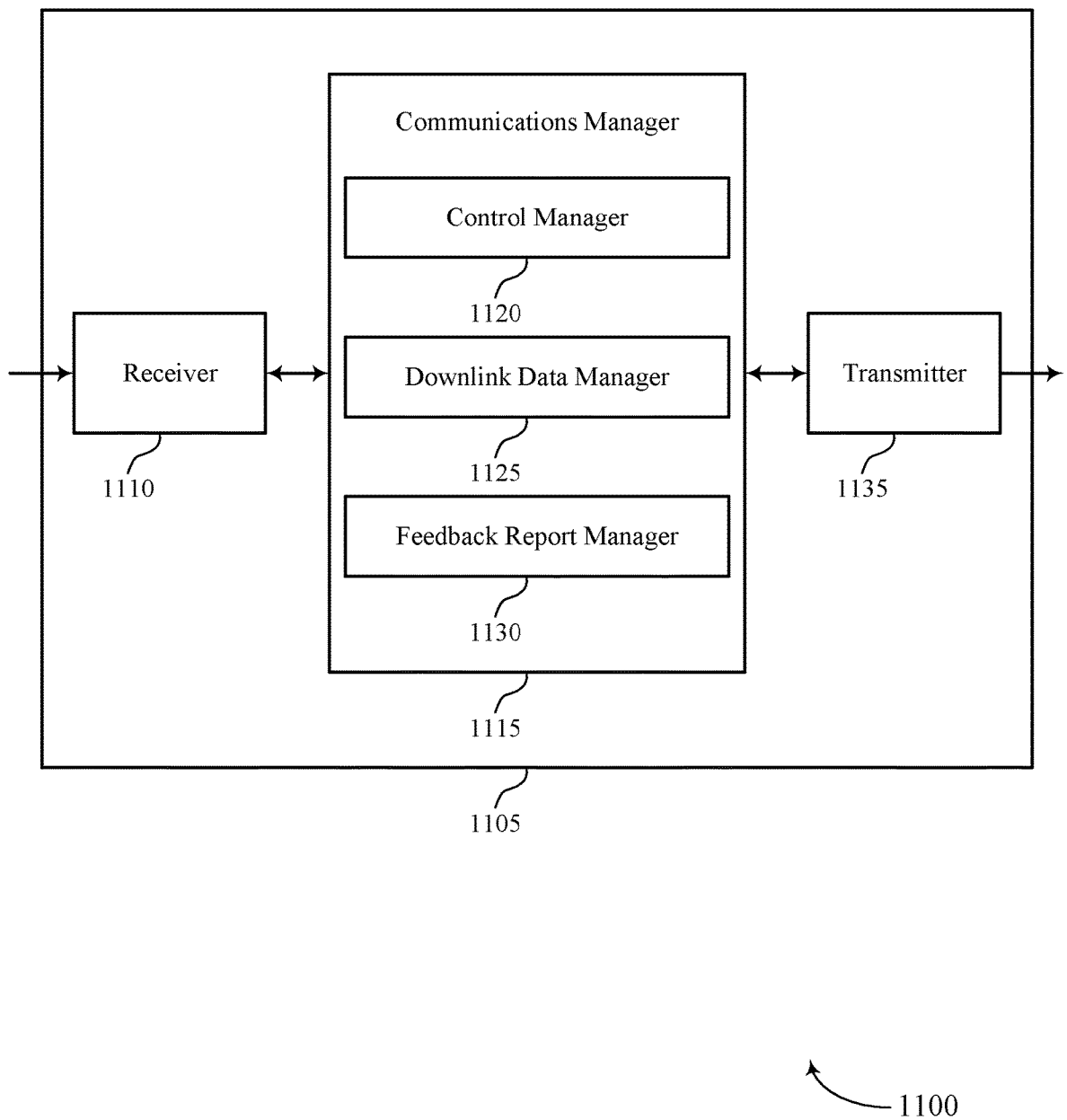

FIG. 11 shows a block diagram 1100 of a device 1105 that supports triggering power saving modes with scheduling DCI in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to triggering power saving modes with scheduling DCI, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a control manager 1120, a downlink data manager 1125, and a feedback report manager 1130. The communications manager 1115 may be an example of aspects of the communications manager 1310 described herein.

The control manager 1120 may transmit, to a UE, a control message associated with a downlink data message, where the control message includes an indication of a power savings mode to be applied by the UE. The downlink data manager 1125 may transmit the downlink data message to the UE. The feedback report manager 1130 may receive, from the UE, a feedback report including a first information bit for downlink data message feedback corresponding to the downlink data message, where the feedback report is indicative, separate from the first information bit, of control information feedback corresponding to the control message.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
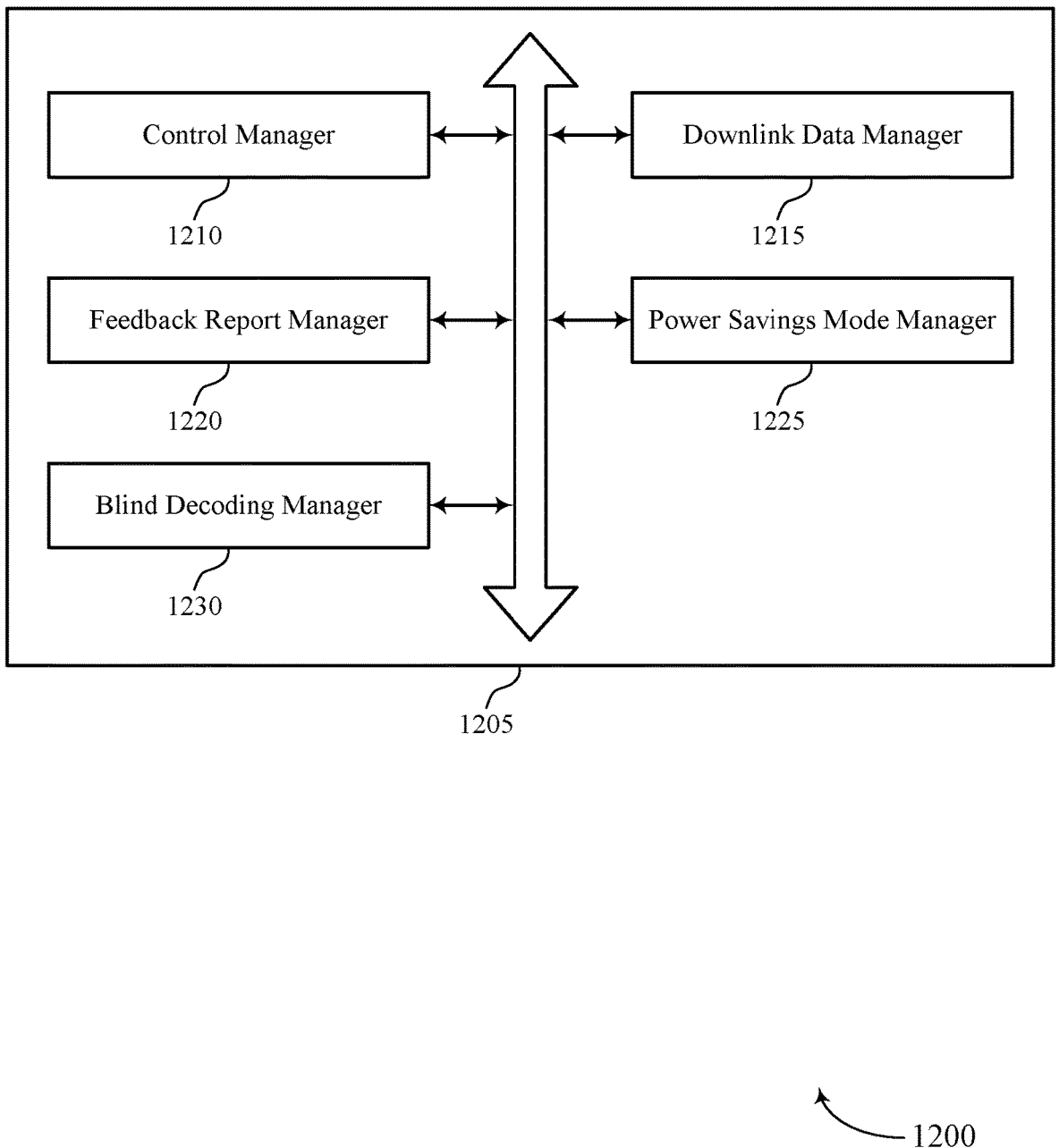
FIG. 12 shows a block diagram of a communications manager that supports triggering power saving modes with scheduling DCI in accordance with aspects of the present disclosure.

FIG. 12 shows a block diagram 1200 of a communications manager 1205 that supports triggering power saving modes with scheduling DCI in accordance with aspects of the present disclosure. The communications manager 1205 may be an example of aspects of a communications manager 1015, a communications manager 1115, or a communications manager 1310 described herein. The communications manager 1205 may include a control manager 1210, a downlink data manager 1215, a feedback report manager 1220, a power savings mode manager 1225, and a blind decoding manager 1230. Each of these modules may communicate, directly or indirectly, with one another (e.g., via one or more buses).

The control manager 1210 may transmit, to a UE, a control message associated with a downlink data message, where the control message includes an indication of a power savings mode to be applied by the UE.

The downlink data manager 1215 may transmit the downlink data message to the UE.

The feedback report manager 1220 may receive, from the UE, a feedback report including a first information bit for downlink data message feedback corresponding to the downlink data message, where the feedback report is indicative, separate from the first information bit, of control information feedback corresponding to the control message. In some cases, the feedback report is indicative of the control information feedback based on the feedback report being transmitted using a waveform, a uplink resource, a scrambling sequence, a cyclic redundancy check encoding sequence, or some combination thereof. In some cases, the feedback report includes a hybrid automatic repeat request feedback report that includes positive acknowledgement/negative acknowledgement information conveyed by the first information bit and the second information bit.

The power savings mode manager 1225 may transition to the power savings mode based on the feedback report, where the feedback report indicates the UE successfully decoded the control message including the indication of the power savings mode. In some examples, the power savings mode manager 1225 may determine to remain in a current power savings mode based on the feedback report, where the feedback report indicates that the UE missed the control message including the indication of the power savings mode. In some cases, the first information bit includes a first acknowledgement corresponding to UE decoding of the downlink data message and a second information bit includes a second acknowledgement corresponding to UE decoding of the control message, where the feedback report is indicative of the control information feedback by including the second information bit for the control information feedback.

In some cases, the first information bit includes a negative acknowledgement corresponding to UE decoding of the downlink data message and a second information bit includes a positive acknowledgement corresponding to UE decoding of the control message, where the feedback report is indicative of the control information feedback by including the second information bit for the control information feedback. In some cases, the first information bit includes a first negative acknowledgement corresponding to the missed downlink data message and a second information bit includes a second negative acknowledgement corresponding to the control message, where the feedback report is indicative of the control information feedback by including the second information bit for the control information feedback.

The blind decoding manager 1230 may decode the received feedback report based on a blind decoding operation, where the blind decoding operation is performed using one or more codebook sizes. In some cases, a first codebook size of the one or more codebook sizes is based on one or both of a number of monitoring occasions configured by the base station and the control message including the indication of the power savings mode. In some cases, a first codebook size of the one or more codebook sizes is based on a number of control message transmissions including power savings mode indications. In some cases, a first codebook size of the one or more codebook sizes is based on a maximum number of power saving mode indications per uplink feedback report occasion. In some cases, the received feedback report is decoded based on a waveform, an uplink resource, a scrambling sequence, a cyclic redundancy check encoding sequence, or some combination thereof.

Figure 13:
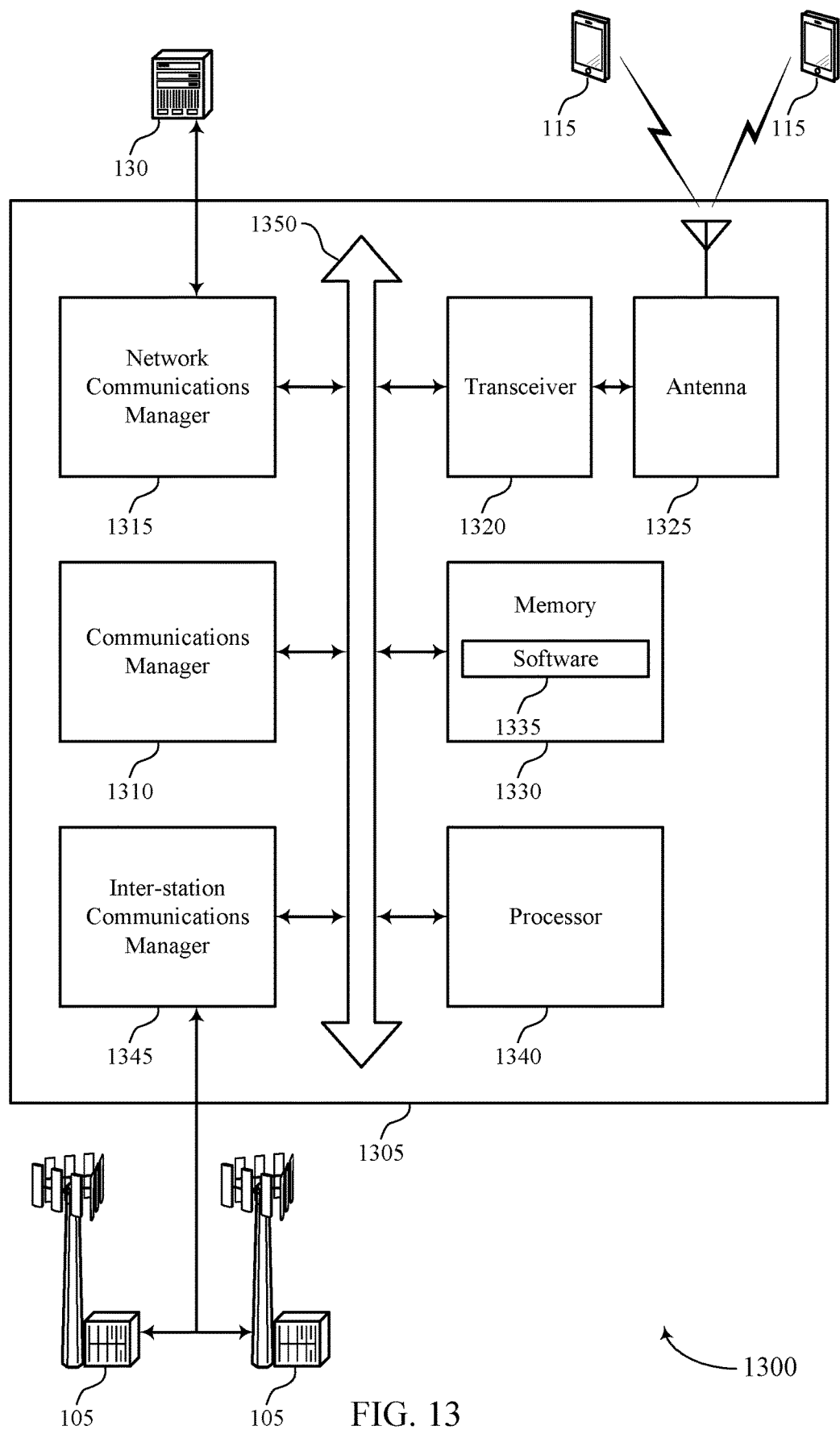
FIG. 13 shows a diagram of a system including a device that supports triggering power saving modes with scheduling DCI in accordance with aspects of the present disclosure.

FIG. 13 shows a diagram of a system 1300 including a device 1305 that supports triggering power saving modes with scheduling DCI in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a control message associated with a downlink data message, where the control message includes an indication of a power savings mode to be applied by the UE, transmit the downlink data message to the UE, and receive, from the UE, a feedback report including a first information bit for downlink data message feedback corresponding to the downlink data message, where the feedback report is indicative, separate from the first information bit, of control information feedback corresponding to the control message.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code or software 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting triggering power saving modes with scheduling DCI).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The software 1335 may include instructions to implement aspects of the present disclosure, including instructions to support wireless communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
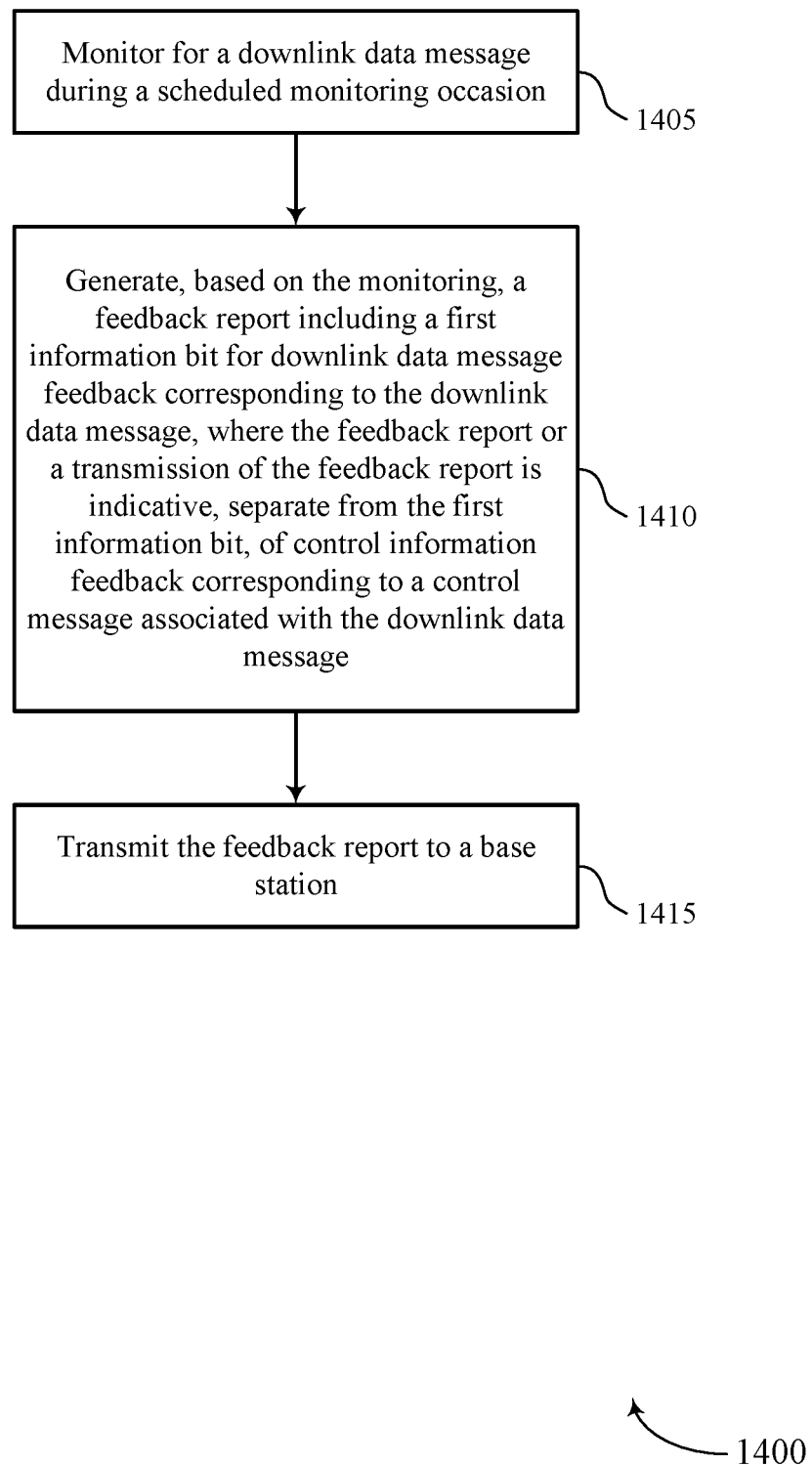
FIGS. 14 through 19 show flowcharts illustrating methods that support triggering power saving modes with scheduling DCI in accordance with aspects of the present disclosure.

FIG. 14 shows a flowchart illustrating a method 1400 that supports triggering power saving modes with scheduling DCI in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may monitor for a downlink data message during a scheduled monitoring occasion. The operations of 1405 may be performed according to the methods described herein. In some examples, aspects of the operations of 1405 may be performed by a monitoring occasion manager as described with reference to FIGS. 6 through 9.

At 1410, the UE may generate, based on the monitoring, a feedback report including a first information bit for downlink data message feedback corresponding to the downlink data message, where the feedback report or a transmission of the feedback report is indicative, separate from the first information bit, of control information feedback corresponding to a control message associated with the downlink data message. The operations of 1410 may be performed according to the methods described herein. In some examples, aspects of the operations of 1410 may be performed by a feedback report manager as described with reference to FIGS. 6 through 9.

At 1415, the UE may transmit the feedback report to a base station. The operations of 1415 may be performed according to the methods described herein. In some examples, aspects of the operations of 1415 may be performed by a feedback report manager as described with reference to FIGS. 6 through 9.

Figure 15:
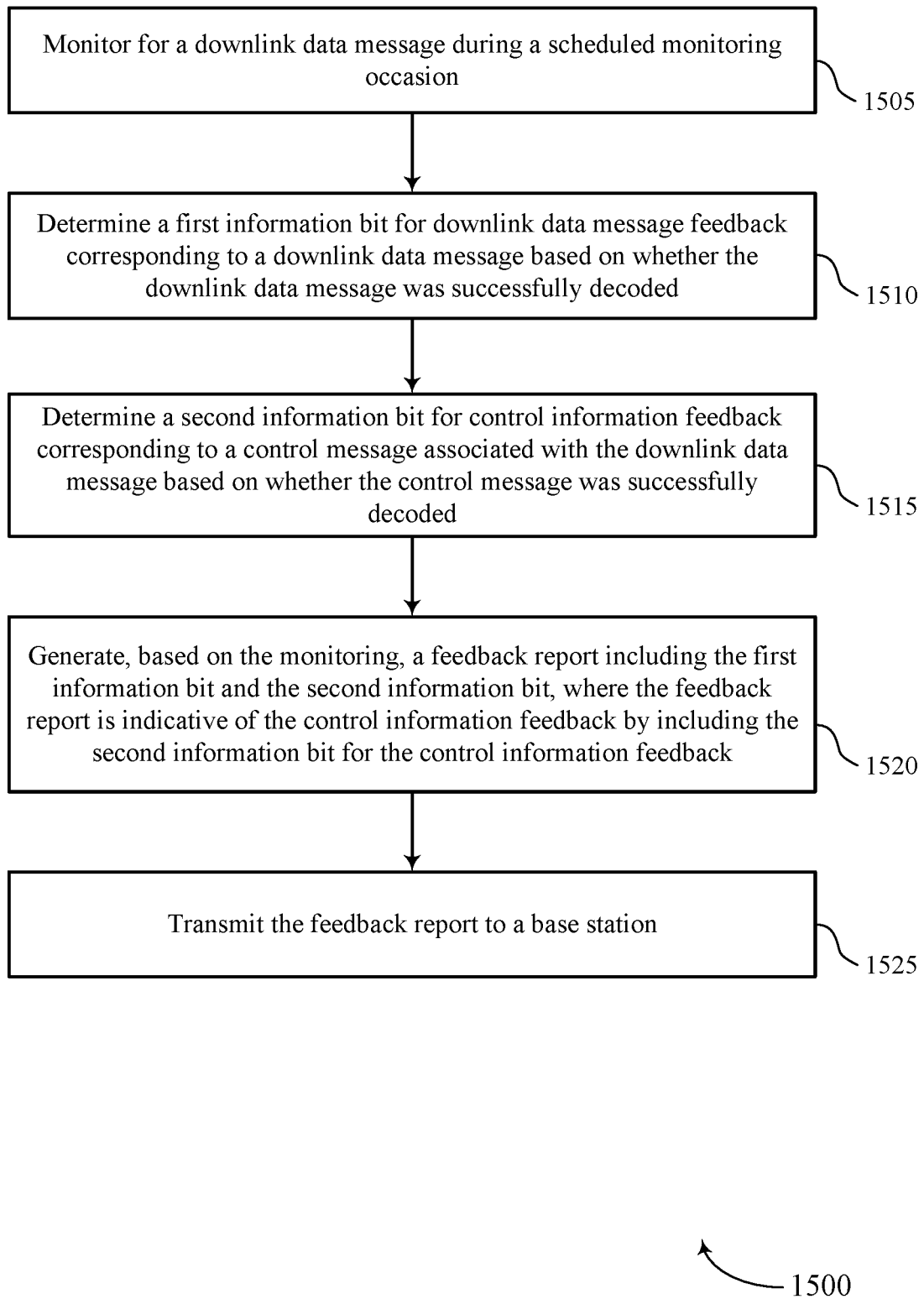

FIG. 15 shows a flowchart illustrating a method 1500 that supports triggering power saving modes with scheduling DCI in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may monitor for a downlink data message during a scheduled monitoring occasion. The operations of 1505 may be performed according to the methods described herein. In some examples, aspects of the operations of 1505 may be performed by a monitoring occasion manager as described with reference to FIGS. 6 through 9.

At 1510, the UE may determine a first information bit for downlink data message feedback corresponding to a downlink data message based on whether the downlink data message was successfully decoded. The operations of 1510 may be performed according to the methods described herein. In some examples, aspects of the operations of 1510 may be performed by a downlink data manager as described with reference to FIGS. 6 through 9.

At 1515, the UE may determine a second information bit for control information feedback corresponding to a control message associated with the downlink data message based on whether the control message was successfully decoded. The operations of 1515 may be performed according to the methods described herein. In some examples, aspects of the operations of 1515 may be performed by a control manager as described with reference to FIGS. 6 through 9.

At 1520, the UE may generate, based on the monitoring, a feedback report including the first information bit and the second information bit, where the feedback report is indicative of the control information feedback by including the second information bit for the control information feedback. The operations of 1520 may be performed according to the methods described herein. In some examples, aspects of the operations of 1520 may be performed by a feedback report manager as described with reference to FIGS. 6 through 9.

At 1525, the UE may transmit the feedback report to a base station. The operations of 1525 may be performed according to the methods described herein. In some examples, aspects of the operations of 1525 may be performed by a feedback report manager as described with reference to FIGS. 6 through 9.

Figure 16:
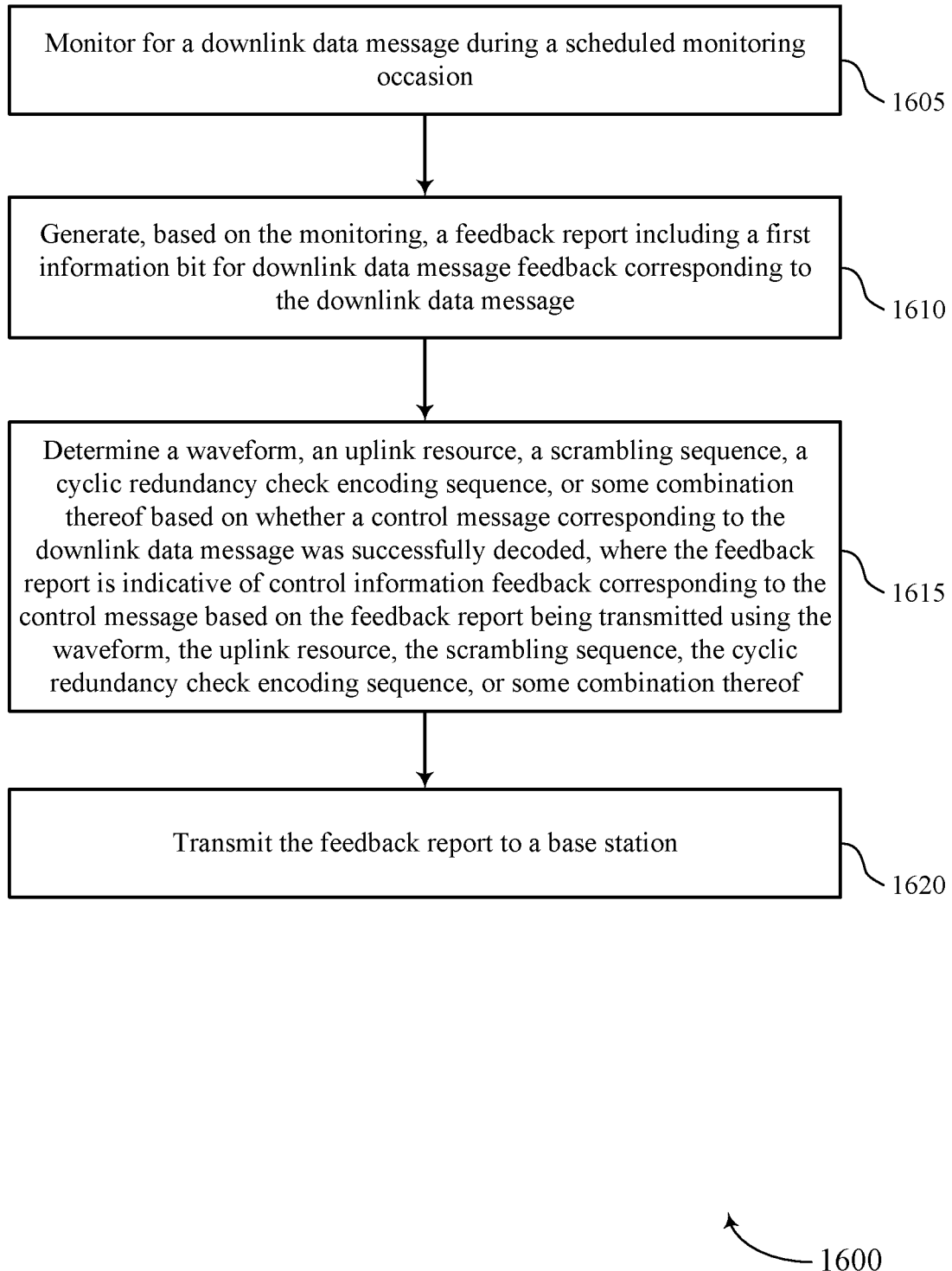

FIG. 16 shows a flowchart illustrating a method 1600 that supports triggering power saving modes with scheduling DCI in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may monitor for a downlink data message during a scheduled monitoring occasion. The operations of 1605 may be performed according to the methods described herein. In some examples, aspects of the operations of 1605 may be performed by a monitoring occasion manager as described with reference to FIGS. 6 through 9.

At 1610, the UE may generate, based on the monitoring, a feedback report including a first information bit for downlink data message feedback corresponding to the downlink data message. The operations of 1610 may be performed according to the methods described herein. In some examples, aspects of the operations of 1610 may be performed by a feedback report manager as described with reference to FIGS. 6 through 9.

At 1615, the UE may determine a waveform, an uplink resource, a scrambling sequence, a cyclic redundancy check encoding sequence, or some combination thereof based on whether a control message corresponding to the downlink data message was successfully decoded, where the feedback report is indicative of control information feedback corresponding to the control message based on the feedback report being transmitted using the waveform, the uplink resource, the scrambling sequence, the cyclic redundancy check encoding sequence, or some combination thereof. The operations of 1615 may be performed according to the methods described herein. In some examples, aspects of the operations of 1615 may be performed by a feedback report manager as described with reference to FIGS. 6 through 9.

At 1620, the UE may transmit the feedback report to a base station. The operations of 1620 may be performed according to the methods described herein. In some examples, aspects of the operations of 1620 may be performed by a feedback report manager as described with reference to FIGS. 6 through 9.

Figure 17:
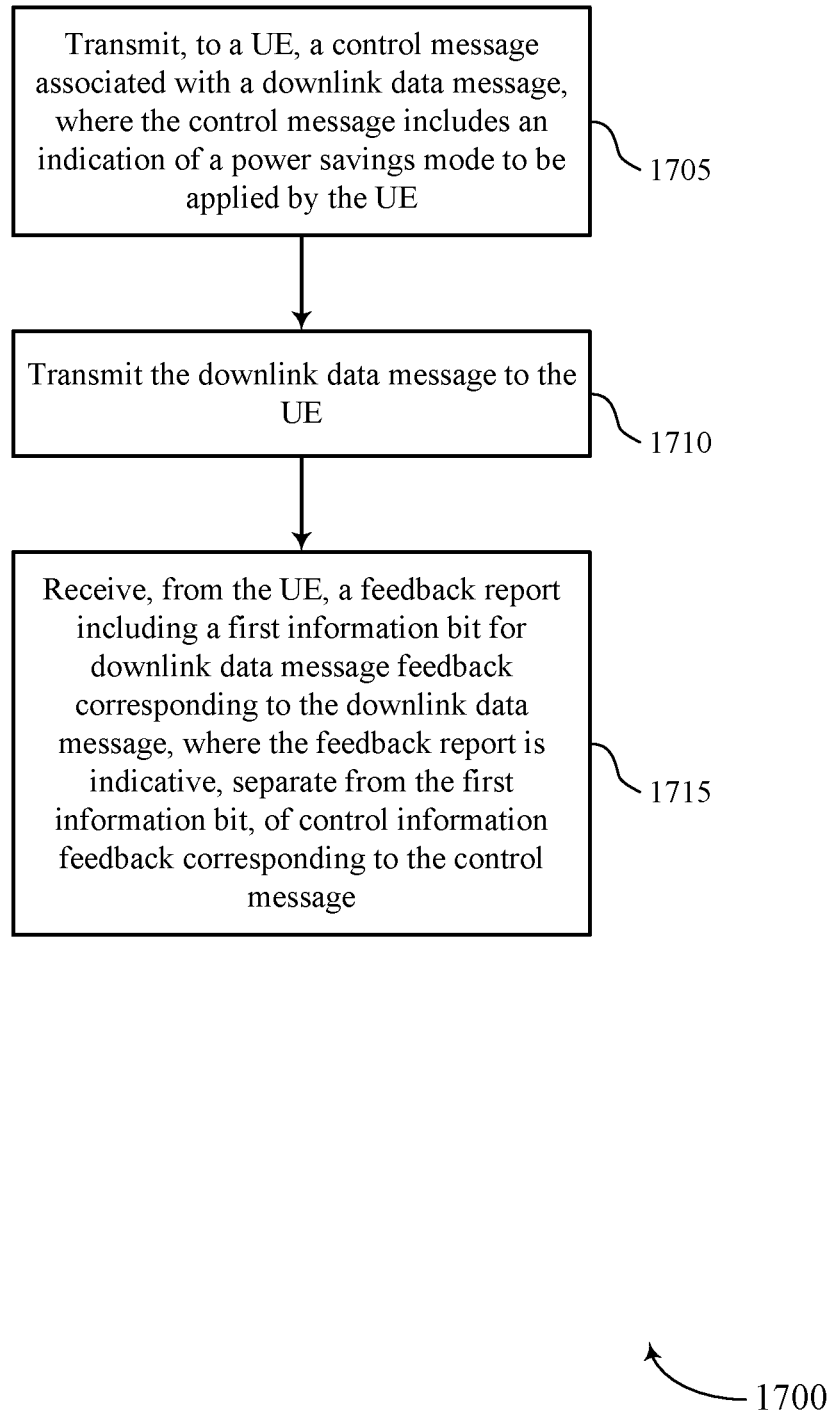

FIG. 17 shows a flowchart illustrating a method 1700 that supports triggering power saving modes with scheduling DCI in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a control message associated with a downlink data message, where the control message includes an indication of a power savings mode to be applied by the UE. The operations of 1705 may be performed according to the methods described herein. In some examples, aspects of the operations of 1705 may be performed by a control manager as described with reference to FIGS. 10 through 13.

At 1710, the base station may transmit the downlink data message to the UE. The operations of 1710 may be performed according to the methods described herein. In some examples, aspects of the operations of 1710 may be performed by a downlink data manager as described with reference to FIGS. 10 through 13.

At 1715, the base station may receive, from the UE, a feedback report including a first information bit for downlink data message feedback corresponding to the downlink data message, where the feedback report is indicative, separate from the first information bit, of control information feedback corresponding to the control message. The operations of 1715 may be performed according to the methods described herein. In some examples, aspects of the operations of 1715 may be performed by a feedback report manager as described with reference to FIGS. 10 through 13.

Figure 18:
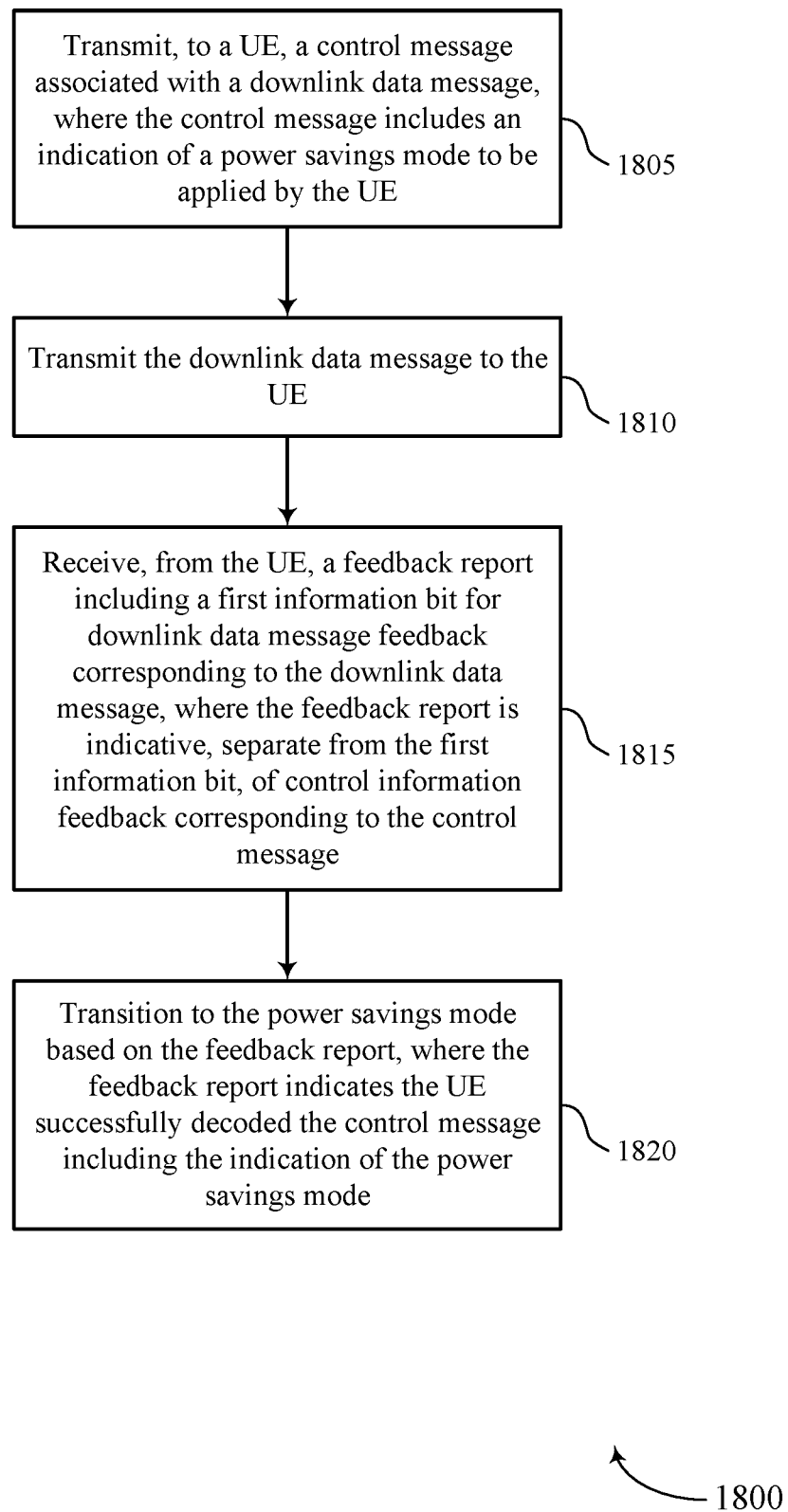

FIG. 18 shows a flowchart illustrating a method 1800 that supports triggering power saving modes with scheduling DCI in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a control message associated with a downlink data message, where the control message includes an indication of a power savings mode to be applied by the UE. The operations of 1805 may be performed according to the methods described herein. In some examples, aspects of the operations of 1805 may be performed by a control manager as described with reference to FIGS. 10 through 13.

At 1810, the base station may transmit the downlink data message to the UE. The operations of 1810 may be performed according to the methods described herein. In some examples, aspects of the operations of 1810 may be performed by a downlink data manager as described with reference to FIGS. 10 through 13.

At 1815, the base station may receive, from the UE, a feedback report including a first information bit for downlink data message feedback corresponding to the downlink data message, where the feedback report is indicative, separate from the first information bit, of control information feedback corresponding to the control message. The operations of 1815 may be performed according to the methods described herein. In some examples, aspects of the operations of 1815 may be performed by a feedback report manager as described with reference to FIGS. 10 through 13.

At 1820, the base station may transition to the power savings mode based on the feedback report, where the feedback report indicates the UE successfully decoded the control message including the indication of the power savings mode. The operations of 1820 may be performed according to the methods described herein. In some examples, aspects of the operations of 1820 may be performed by a power savings mode manager as described with reference to FIGS. 10 through 13.

Figure 19:
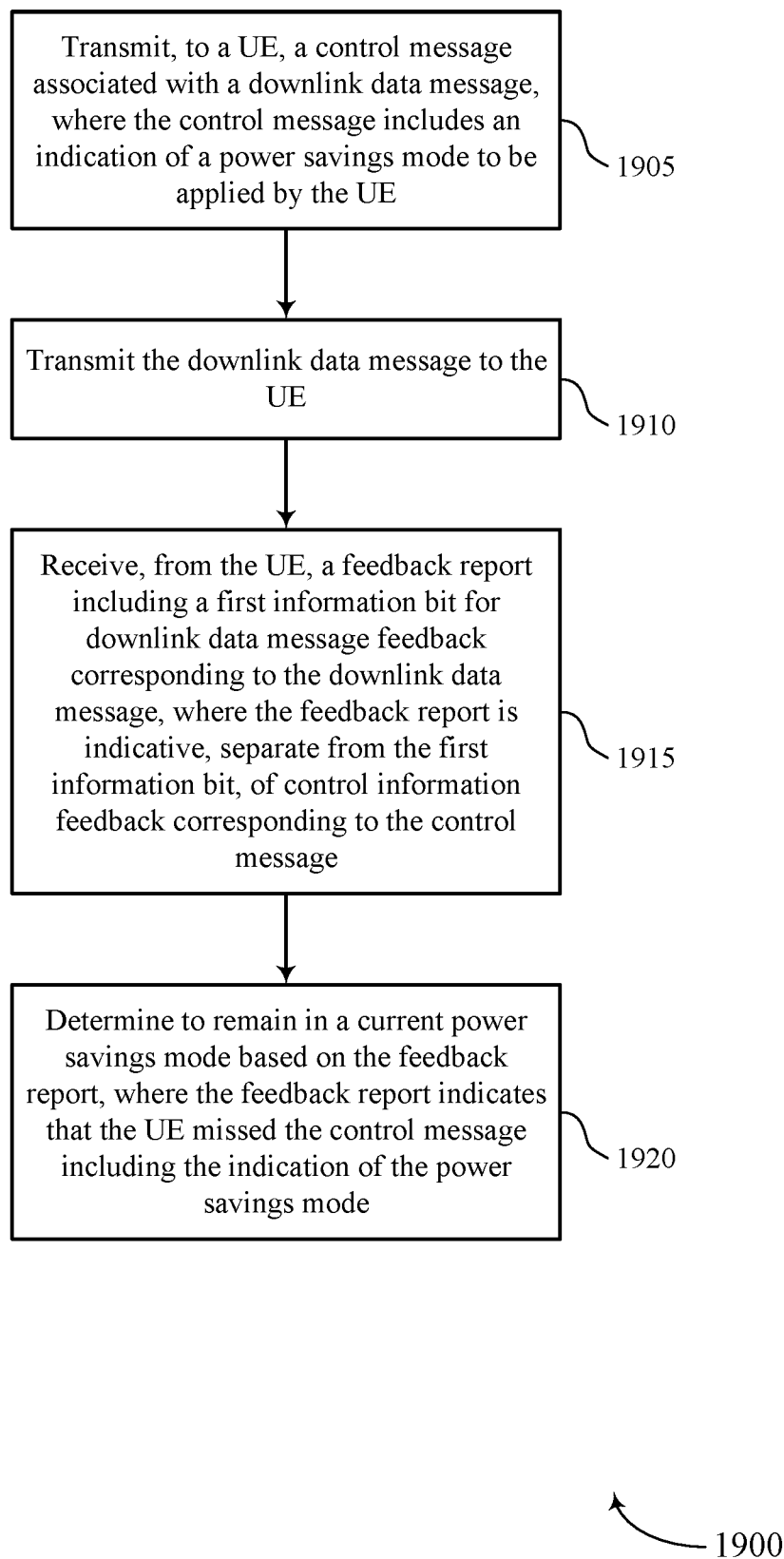

FIG. 19 shows a flowchart illustrating a method 1900 that supports triggering power saving modes with scheduling DCI in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, a control message associated with a downlink data message, where the control message includes an indication of a power savings mode to be applied by the UE. The operations of 1905 may be performed according to the methods described herein. In some examples, aspects of the operations of 1905 may be performed by a control manager as described with reference to FIGS. 10 through 13.

At 1910, the base station may transmit the downlink data message to the UE. The operations of 1910 may be performed according to the methods described herein. In some examples, aspects of the operations of 1910 may be performed by a downlink data manager as described with reference to FIGS. 10 through 13.

At 1915, the base station may receive, from the UE, a feedback report including a first information bit for downlink data message feedback corresponding to the downlink data message, where the feedback report is indicative, separate from the first information bit, of control information feedback corresponding to the control message. The operations of 1915 may be performed according to the methods described herein. In some examples, aspects of the operations of 1915 may be performed by a feedback report manager as described with reference to FIGS. 10 through 13.

At 1920, the base station may determine to remain in a current power savings mode based on the feedback report, where the feedback report indicates that the UE missed the control message including the indication of the power savings mode. The operations of 1920 may be performed according to the methods described herein. In some examples, aspects of the operations of 1920 may be performed by a power savings mode manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Described below are a number of embodiments of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible embodiments, and other examples will be readily apparent to those skilled in the art without departing from the scope of the disclosure.

Example 1: A method for wireless communication at a user equipment (UE), comprising: monitoring for a downlink data message during a scheduled monitoring occasion; generating, based at least in part on the monitoring, a feedback report comprising a first information bit for downlink data message feedback corresponding to the downlink data message, wherein the feedback report or a transmission of the feedback report is indicative, separate from the first information bit, of control information feedback corresponding to a control message associated with the downlink data message; and transmitting the feedback report to a base station.

Example 2: The method of example 1, wherein generating the feedback report comprises: determining the first information bit based at least in part on whether the downlink data message was successfully decoded; and determining a second information bit based at least in part on whether the control message was successfully decoded, wherein the feedback report is indicative of the control information feedback by including the second information bit for the control information feedback.

Example 3: The method of example 2, further comprising: decoding the control message, wherein the control message comprises an indication of a power savings mode; and transitioning to the power savings mode based at least in part on the indication, wherein the second information bit is indicative of successful decoding of the indication.

Example 4: The method of example 3, further comprising: decoding the downlink data message based at least in part on the monitoring, wherein the first information bit comprises a first acknowledgement corresponding to the decoding of the downlink data message and the second information bit comprises a second acknowledgement corresponding to the decoding of the control message.

Example 5: The method of example 3, wherein presence of the second information bit in the feedback report is indicative that the control message includes the indication of the power savings mode.

Example 6: The method of example 3, further comprising: determining that the downlink data message was missed based at least in part on the monitoring, wherein the first information bit indicates that the downlink data message was missed.

Example 7: The method of example 6, wherein the first information bit comprises a negative acknowledgement corresponding to the missed downlink data message and the second information bit comprises a positive acknowledgement corresponding to the decoding of the control message.

Example 8: The method of example 6, wherein presence of the second information bit in the feedback report is based at least in part on the determination that the downlink data message was missed even though the control message was successfully decoded.

Example 9: The method of example 2, further comprising: determining that both the control message and the downlink data message were missed, wherein the first information bit and the second information bit indicate that the downlink data message and the control message were missed, respectively.

Example 10: The method of example 9, wherein the first information bit comprises a first negative acknowledgement corresponding to the missed downlink data message and the second information bit comprises a second negative acknowledgement corresponding to the missed control message.

Example 11: The method of example 2, wherein the feedback report comprises a hybrid automatic repeat request feedback report that includes positive acknowledgement/negative acknowledgement information conveyed by the first information bit and the second information bit.

Example 12: The method of any of examples 1 through 11, further comprising: determining a waveform, an uplink resource, a scrambling sequence, a cyclic redundancy check encoding sequence, or some combination thereof based at least in part on whether the control message was successfully decoded, wherein the feedback report is indicative of the control information feedback based on the feedback report being transmitted using the waveform, the uplink resource, the scrambling sequence, the cyclic redundancy check encoding sequence, or some combination thereof.

Example 13: An apparatus comprising at least one means for performing a method of any of examples 1 to 12.

Example 14: An apparatus for wireless communications comprising: a processor; memory coupled with the processor; and instructions stored in the memory and executable by the processor to cause the apparatus to perform a method of any of examples 1 to 12.

Example 15: A non-transitory computer-readable medium storing code for wireless communications, the code comprising instructions executable by a processor to perform a method of any of examples 1 to 12.

Example 16: A method for wireless communication at a base station, comprising: transmitting, to a user equipment (UE), a control message associated with a downlink data message, wherein the control message comprises an indication of a power savings mode to be applied by the UE; transmitting the downlink data message to the UE; and receiving, from the UE, a feedback report comprising a first information bit for downlink data message feedback corresponding to the downlink data message, wherein the feedback report is indicative, separate from the first information bit, of control information feedback corresponding to the control message.

Example 17: The method of example 16, further comprising: transitioning to the power savings mode based at least in part on the feedback report, wherein the feedback report indicates the UE successfully decoded the control message comprising the indication of the power savings mode.

Example 18: The method of example 17, wherein the first information bit comprises a first acknowledgement corresponding to UE decoding of the downlink data message and a second information bit comprises a second acknowledgement corresponding to UE decoding of the control message, wherein the feedback report is indicative of the control information feedback by including the second information bit for the control information feedback.

Example 19: The method of example 17, wherein the first information bit comprises a negative acknowledgement corresponding to UE decoding of the downlink data message and a second information bit comprises a positive acknowledgement corresponding to UE decoding of the control message, wherein the feedback report is indicative of the control information feedback by including the second information bit for the control information feedback.

Example 20: The method of any of examples 16 through 19, further comprising: determining to remain in a current power savings mode based at least in part on the feedback report, wherein the feedback report indicates that the UE missed the control message comprising the indication of the power savings mode.

Example 21: The method of example 20, wherein the first information bit comprises a first negative acknowledgement corresponding to the missed downlink data message and a second information bit comprises a second negative acknowledgement corresponding to the control message, wherein the feedback report is indicative of the control information feedback by including the second information bit for the control information feedback.

Example 22: The method of any of examples 16 through 21, further comprising: decoding the received feedback report based at least in part on a blind decoding operation, wherein the blind decoding operation is performed using one or more codebook sizes.

Example 23: The method of example 22, wherein a first codebook size of the one or more codebook sizes is based at least in part on one or both of a number of monitoring occasions configured by the base station and the control message comprising the indication of the power savings mode.

Example 24: The method of example 22, wherein a first codebook size of the one or more codebook sizes is based at least in part on a number of control message transmissions comprising power savings mode indications.

Example 25: The method of example 22, wherein a first codebook size of the one or more codebook sizes is based at least in part on a maximum number of power saving mode indications per uplink feedback report occasion.

Example 26: The method of example 22, wherein the received feedback report is decoded based at least in part on a waveform, an uplink resource, a scrambling sequence, a cyclic redundancy check encoding sequence, or some combination thereof.

Example 27: The method of any of examples 16 through 26, wherein the feedback report is indicative of the control information feedback based on the feedback report being transmitted using a waveform, a uplink resource, a scrambling sequence, a cyclic redundancy check encoding sequence, or some combination thereof.

Example 28: The method of any of examples 16 through 27, wherein the feedback report comprises a hybrid automatic repeat request feedback report that includes positive acknowledgement/negative acknowledgement information conveyed by the first information bit and the second information bit.

Example 29: An apparatus comprising at least one means for performing a method of any of examples 16 to 28.

Example 30: An apparatus for wireless communications comprising: a processor; memory coupled with the processor; and instructions stored in the memory and executable by the processor to cause the apparatus to perform a method of any of examples 16 to 28.

Example 31: A non-transitory computer-readable medium storing code for wireless communications, the code comprising instructions executable by a processor to perform a method of any of examples 16 to 28.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

What is claimed is:

1. A method for wireless communication at a user equipment (UE), comprising:
   receiving a control message scheduling a downlink data message, the control message comprising a bit field indicating a power saving mode from a plurality of power saving modes for the UE, the plurality of power saving modes corresponding to a set of minimum downlink control channel monitoring periodicities, a set of minimum downlink scheduling offsets, and a set of maximum downlink MIMO layer quantities for the UE, wherein a quantity of bits of the bit field is based at least in part on a quantity of the plurality of power saving modes for the UE, and wherein operation in the indicated power saving mode comprises monitoring a downlink control channel according to a respective minimum downlink control channel monitoring periodicity of the set of minimum downlink control channel monitoring periodicities, using a respective minimum downlink scheduling offset of the set of minimum downlink scheduling offsets, and using a respective maximum quantity of downlink MIMO layers of the set of maximum downlink MIMO layer quantities;
   monitoring for the downlink data message during a scheduled monitoring occasion based at least in part on the control message;
   generating, based at least in part on the monitoring, a feedback report comprising a first information bit for downlink data message feedback corresponding to the downlink data message, wherein the feedback report or a transmission of the feedback report is indicative, separate from the first information bit, of control information feedback corresponding to the control message associated with the downlink data message; and
   transmitting the feedback report to a network device.

2. The method of claim 1, wherein generating the feedback report comprises:
   determining the first information bit based at least in part on whether the downlink data message was successfully decoded; and
   determining a second information bit based at least in part on whether the control message was successfully decoded, wherein the feedback report is indicative of the control information feedback by including the second information bit for the control information feedback.

3. The method of claim 2, further comprising:
   decoding the control message; and
   transitioning to the indicated power saving mode based at least in part on the indication.

4. The method of claim 3, further comprising:
   decoding the downlink data message based at least in part on the monitoring, wherein the first information bit comprises a first acknowledgement corresponding to the decoding of the downlink data message and the second information bit comprises a second acknowledgement corresponding to the decoding of the control message.

5. The method of claim 3, wherein:
presence of the second information bit in the feedback report is indicative that the control message includes the indication of the power saving mode.

6. The method of claim 3, further comprising:
determining that the downlink data message was missed based at least in part on the monitoring, wherein the first information bit indicates that the downlink data message was missed.

7. The method of claim 6, wherein the first information bit comprises a negative acknowledgement corresponding to the missed downlink data message and the second information bit comprises a positive acknowledgement corresponding to the decoding of the control message.

8. The method of claim 6, wherein:
presence of the second information bit in the feedback report is based at least in part on the determination that the downlink data message was missed even though the control message was successfully decoded.

9. The method of claim 2, further comprising:
determining that both the control message and the downlink data message were missed, wherein the first information bit and the second information bit indicate that the downlink data message and the control message were missed, respectively.

10. The method of claim 9, wherein the first information bit comprises a first negative acknowledgement corresponding to the missed downlink data message and the second information bit comprises a second negative acknowledgement corresponding to the missed control message.

11. The method of claim 2, wherein the feedback report comprises a hybrid automatic repeat request feedback report that includes positive acknowledgement/negative acknowledgement information conveyed by the first information bit and the second information bit.

12. The method of claim 1, further comprising:
determining a waveform, an uplink resource, a scrambling sequence, a cyclic redundancy check encoding sequence, or some combination thereof based at least in part on whether the control message was successfully decoded, wherein the feedback report is indicative of the control information feedback based on the feedback report being transmitted using the waveform, the uplink resource, the scrambling sequence, the cyclic redundancy check encoding sequence, or some combination thereof.

13. A method for wireless communication at a network device, comprising:
transmitting, to a user equipment (UE), a control message scheduling a downlink data message, the control message comprising a bit field indicating a power saving mode from a plurality of power saving modes for the UE, the plurality of power saving modes corresponding to a set of minimum downlink control channel monitoring periodicities, a set of minimum downlink scheduling offsets, and a set of maximum downlink MIMO layer quantities to be applied by the UE, wherein a quantity of bits of the bit field is based at least in part on a quantity of the plurality of power saving modes for the UE, and wherein operation in the indicated power saving mode comprises monitoring a downlink control channel according to a respective minimum downlink control channel monitoring periodicity of the set of minimum downlink control channel monitoring periodicities, using a respective minimum downlink scheduling offset of the set of minimum downlink scheduling offsets, and using a respective maximum quantity of downlink MIMO layers of the set of maximum downlink MIMO layer quantities;
transmitting the downlink data message to the UE based at least in part on the control message; and
receiving, from the UE, a feedback report comprising a first information bit for downlink data message feedback corresponding to the downlink data message, wherein the feedback report is indicative, separate from the first information bit, of control information feedback corresponding to the control message.

14. The method of claim 13, further comprising:
transitioning to the indicated power saving mode based at least in part on the feedback report, wherein the feedback report indicates the UE successfully decoded the control message comprising the indication of power saving mode.

15. The method of claim 14, wherein the first information bit comprises a first acknowledgement corresponding to UE decoding of the downlink data message and a second information bit comprises a second acknowledgement corresponding to UE decoding of the control message, wherein the feedback report is indicative of the control information feedback by including the second information bit for the control information feedback.

16. The method of claim 14, wherein the first information bit comprises a negative acknowledgement corresponding to UE decoding of the downlink data message and a second information bit comprises a positive acknowledgement corresponding to UE decoding of the control message, wherein the feedback report is indicative of the control information feedback by including the second information bit for the control information feedback.

17. The method of claim 13, further comprising:
determining to remain in a current power saving mode based at least in part on the feedback report, wherein the feedback report indicates that the UE missed the control message comprising the indication of the power saving mode.

18. The method of claim 17, wherein the first information bit comprises a first negative acknowledgement corresponding to a missed downlink data message and a second information bit comprises a second negative acknowledgement corresponding to the control message, wherein the feedback report is indicative of the control information feedback by including the second information bit for the control information feedback.

19. The method of claim 13, further comprising:
decoding the received feedback report based at least in part on a blind decoding operation, wherein the blind decoding operation is performed using one or more codebook sizes.

20. The method of claim 19, wherein a first codebook size of the one or more codebook sizes is based at least in part on one or both of a number of monitoring occasions configured by the network device and the control message comprising the indication of the power saving mode.

21. The method of claim 19, wherein a first codebook size of the one or more codebook sizes is based at least in part on a number of control message transmissions comprising power saving mode indications.

22. The method of claim 19, wherein a first codebook size of the one or more codebook sizes is based at least in part on a maximum number of power saving mode indications per uplink feedback report occasion.

23. The method of claim 19, wherein the received feedback report is decoded based at least in part on a waveform, an uplink resource, a scrambling sequence, a cyclic redundancy check encoding sequence, or some combination thereof.

24. The method of claim 13, wherein the feedback report is indicative of the control information feedback based on the feedback report being transmitted using a waveform, an uplink resource, a scrambling sequence, a cyclic redundancy check encoding sequence, or some combination thereof.

25. The method of claim 13, wherein the feedback report comprises a hybrid automatic repeat request feedback report that includes positive acknowledgement/negative acknowledgement information conveyed by the first information bit and a second information bit.

26. An apparatus for wireless communication at a user equipment (UE), comprising:
a processor,
memory coupled with the processor; and
instructions stored in the memory and executable by the processor to cause the apparatus to:
receive a control message scheduling a downlink data message, the control message comprising a bit field indicating a power saving mode from a plurality of power saving modes for the UE, the plurality of power saving modes corresponding to a set of minimum downlink control channel monitoring periodicities, a set of minimum downlink scheduling offsets, and a set of maximum downlink MIMO layer quantities for the UE, wherein a quantity of bits of the bit field is based at least in part on a quantity of the plurality of power saving modes for the UE, and wherein operation in the indicated power saving mode comprises monitoring a downlink control channel according to a respective minimum downlink control channel monitoring periodicity of the set of minimum downlink control channel monitoring periodicities, using a respective minimum downlink scheduling offset of the set of minimum downlink scheduling offsets, and using a respective maximum quantity of downlink MIMO layers of the set of maximum downlink MIMO layer quantities;
monitor for the downlink data message during a scheduled monitoring occasion based at least in part on the control message;
generate, based at least in part on the monitoring, a feedback report comprising a first information bit for downlink data message feedback corresponding to the downlink data message, wherein the feedback report or a transmission of the feedback report is indicative, separate from the first information bit, of control information feedback corresponding to the control message associated with the downlink data message; and
transmit the feedback report to a network device.

27. The apparatus of claim 26, wherein the instructions to generate the feedback report are executable by the processor to cause the apparatus to:
determine the first information bit based at least in part on whether the downlink data message was successfully decoded; and
determine a second information bit based at least in part on whether the control message was successfully decoded, wherein the feedback report is indicative of the control information feedback by including the second information bit for the control information feedback.

28. The apparatus of claim 27, wherein the instructions are further executable by the processor to cause the apparatus to:
decode the control message; and
transition to the indicated power saving mode based at least in part on the indication.

29. The apparatus of claim 28, wherein the instructions are further executable by the processor to cause the apparatus to:
decode the downlink data message based at least in part on the monitoring, wherein the first information bit comprises a first acknowledgement corresponding to the decoding of the downlink data message and the second information bit comprises a second acknowledgement corresponding to the decoding of the control message.

30. An apparatus for wireless communication at a network device, comprising:
a processor,
memory coupled with the processor; and
instructions stored in the memory and executable by the processor to cause the apparatus to:
transmit, to a user equipment (UE), a control message scheduling a downlink data message, the control message comprising a bit field indicating a power saving mode from a plurality of power saving modes for the UE, the plurality of power saving modes corresponding to a set of minimum downlink control channel monitoring periodicities, a set of minimum downlink scheduling offsets, and a set of maximum downlink MIMO layer quantities to be applied by the UE, wherein a quantity of bits of the bit field is based at least in part on a quantity of the plurality of power saving modes for the UE, and wherein operation in the indicated power saving mode comprises monitoring a downlink control channel according to a respective minimum downlink control channel monitoring periodicity of the set of minimum downlink control channel monitoring periodicities, using a respective minimum downlink scheduling offset of the set of minimum downlink scheduling offsets, and using a respective maximum quantity of downlink MIMO layers of the set of maximum downlink MIMO layer quantities;
transmit the downlink data message to the UE based at least in part on the control message; and
receive, from the UE, a feedback report comprising a first information bit for downlink data message feedback corresponding to the downlink data message, wherein the feedback report is indicative, separate from the first information bit, of control information feedback corresponding to the control message.

\* \* \* \* \*